US007702127B2

(12) United States Patent
Mihcak et al.

(10) Patent No.: US 7,702,127 B2

(45) Date of Patent: Apr. 20, 2010

(54) VIDEO FINGERPRINTING USING COMPLEXITY-REGULARIZED VIDEO WATERMARKING BY STATISTICS QUANTIZATION

(75) Inventors: Mehmet Kivanc Mihcak, Redmond, WA (US); Oztan Harmanci, Rochester, NY (US)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 11/256,642

(22) Filed: Oct. 21, 2005

(65) Prior Publication Data

US 2007/0092103 A1 Apr. 26, 2007

(51) Int. Cl.
*G06K 9/00* (2006.01)

(52) U.S. Cl. ........................................................ 382/100

(58) Field of Classification Search ................. 382/100, 382/232–253; 380/200–242; 358/426.01–426.16; 354/555; 348/384.1–440.1; 375/122, 240.01–240.29
See application file for complete search history.

(56) References Cited

U.S. PATENT DOCUMENTS 6,005,643 A * 12/1999 Morimoto et al. ...... 375/240.26
6,226,387 B1 * 5/2001 Tewfik et al. ............... 382/100
7,415,127 B2 * 8/2008 Bodo et al. ................. 382/100
2005/0154892 A1 * 7/2005 Mihcak et al. .............. 713/176

* cited by examiner

*Primary Examiner*—Samir A. Ahmed
*Assistant Examiner*—Atiba O. Fitzpatrick
(74) *Attorney, Agent, or Firm*—Lee & Hayes, PLLC

(57) ABSTRACT

Video fingerprinting using watermarks is described herein. A watermark encoder embeds a watermark into an input video to produce a watermarked video. The watermark encoder can choose particular regions of the video that are sufficiently complex for watermarking. Spatial and temporal complexity analyses can be performed on a per-pixel basis to locate suitable regions of the video. The watermarks can be embedded using a unique codeword associated with a given user. A watermark decoder can receive the watermarked video. In some instances, the watermarked video may have been attacked in some way after being output by the watermark encoder. In these instances, the watermark decoder can extract the watermark from the watermarked video. In turn, the watermark decoder can extract the codeword from the watermark, and compare the extracted codeword to a plurality of known codewords associated with respective users.

20 Claims, 21 Drawing Sheets

MOTION VECTORS

CUMULATIVE MOTION VECTORS

VIDEO FINGERPRINTING USING COMPLEXITY-REGULARIZED VIDEO WATERMARKING BY STATISTICS QUANTIZATION

BACKGROUND

Piracy is an increasing problem faced by video content owners, such as companies that produce, market, and distribute motion pictures. In some instances, the piracy takes the form of unauthorized duplication or leaking of video, whether voluntary or not. In other instances, the piracy can take the form of unauthorized adaptation, editing, or other transformation of the video.

In any event, the piracy may be an "inside job", in the sense that persons associated with, for example, the companies that produce, market, and distribute the motion pictures may be involved with the acts that constitute video piracy. In such instances, it may be beneficial to identify the insiders who are engaging in or otherwise involved with video piracy, whether such involvement is voluntary or not.

SUMMARY

Video fingerprinting using watermarks is described herein. A watermark encoder embeds a watermark into an input video to produce a watermarked video. The watermark encoder can choose particular regions of the video that are sufficiently complex for watermarking. Spatial and temporal complexity analyses can be performed on a per-pixel basis to locate suitable regions of the video. The watermarks can be embedded using a unique codeword associated with a given user.

A watermark decoder can receive the watermarked video. In some instances, the watermarked video may have been attacked in some way after being output by the watermark encoder. In these instances, the watermark decoder can extract the watermark from the watermarked video. In turn, the watermark decoder can extract the codeword from the watermark, and compare the extracted codeword to a plurality of known codewords associated with respective users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The same numbers are used throughout the drawings to reference like features and components. In the figures, the left-most digit(s) of a reference number identifies the figure in which the reference number first appears. The use of the same reference numbers in different figures indicates similar or identical items.

Figure 1:
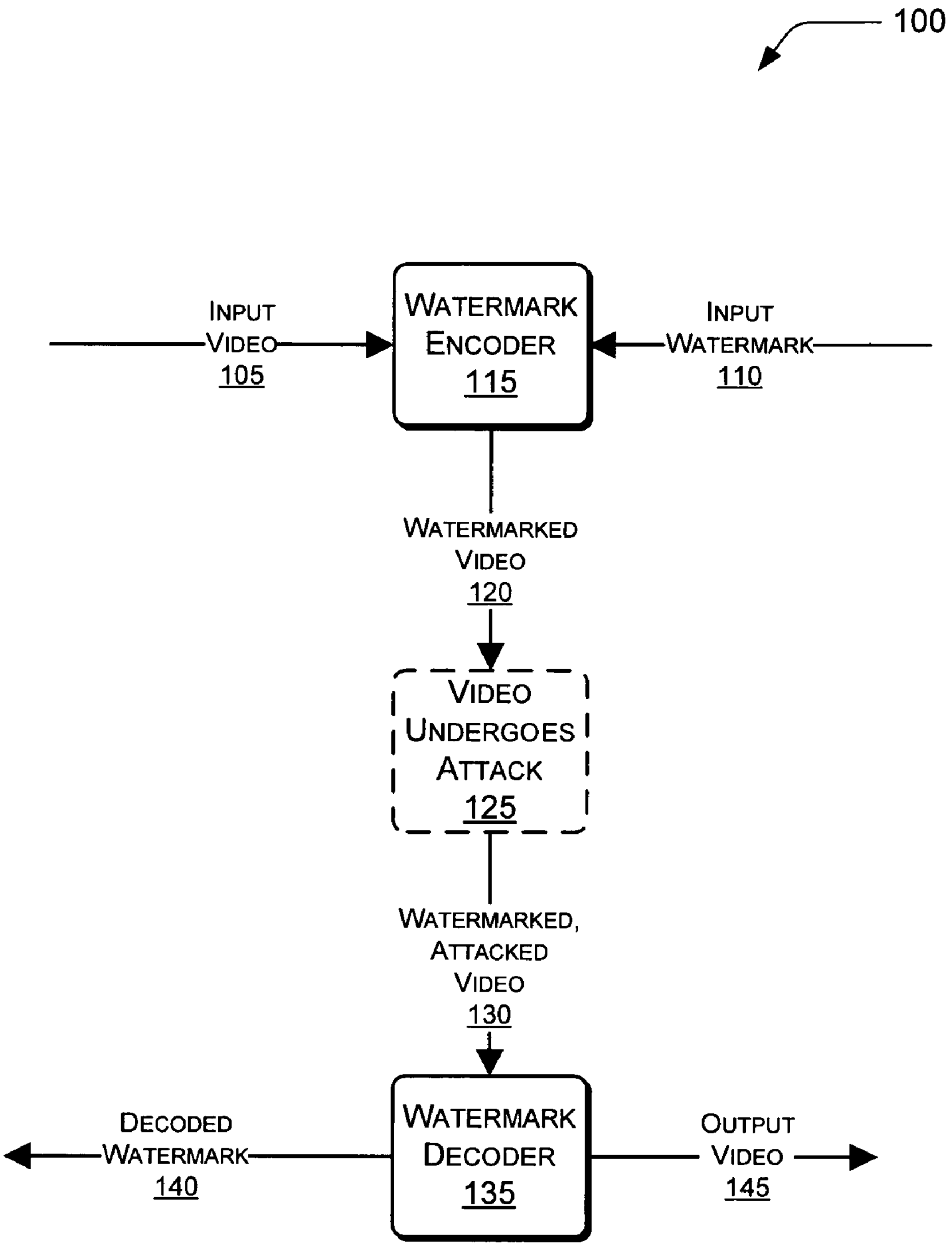
FIG. 1 is a block diagram of an illustrative architecture for video fingerprinting using watermarks, providing illustrative components and data flows.

FIG. 1 illustrates an architecture 100 for fingerprinting an input video 105 using an input watermark 110. The architecture 100 includes a watermark encoder 115, which is operative to receive the video 105 and the watermark 110, and to embed or encode the watermark 110 into the video 105, producing a watermarked video 120.

Block 125 represents a process by which the watermarked video 120 is attacked. Suitable examples of attacks can include unauthorized copying of the watermarked video 120, unauthorized modifications of the watermarked video 120, or the like. In instances in which the watermarked video 120 undergoes some type of attack, the results of that attack are represented generally as attacked video 130. Various examples of attack are further discussed below.

Block 125 is shown in dashed outline to indicate that it is not to be considered as part of the architecture 100, but is nevertheless included in FIG. 1 to facilitate a full discussion of an illustrative environment in which the architecture 100 may operate. In instances where the watermarked video 120 undergoes some form of attack, the attacked video 130 may pass to a watermark decoder 135

The watermark decoder 135 is operative to receive the attacked video 130 and to extract or decode a watermark 140 therefrom. If the extracted watermark 140 matches the input watermark 110, this may provide guidance on investigating the nature of the attack. More particularly, in some implementations of the architecture 100, given watermarks 110 can be associated with respective persons. When the watermark 140 extracted from an attacked video 130 matches a watermark 110 associated with some person, this may indicate that the person was involved in the attack, or may provide at least part of the chain of custody associated with the attacked video 130.

The watermark decoder 135 can also be operative to process the attacked video 130 so as to "undo" the attack. In such implementations, the output video 145 represents the attacked video 130 after the attack is "undone" by the watermark decoder 135. Various approaches and techniques for undoing such attacks are discussed in further detail below.

It is understood that each instance of the watermarked video 120 is not necessarily attacked. Where the watermarked video 120 is not attacked, it may nevertheless pass directly to the watermark decoder 135 for processing. Once again, block 125 is shown in dashed outline to indicate that it is, in some sense, optional.

Figure 2:
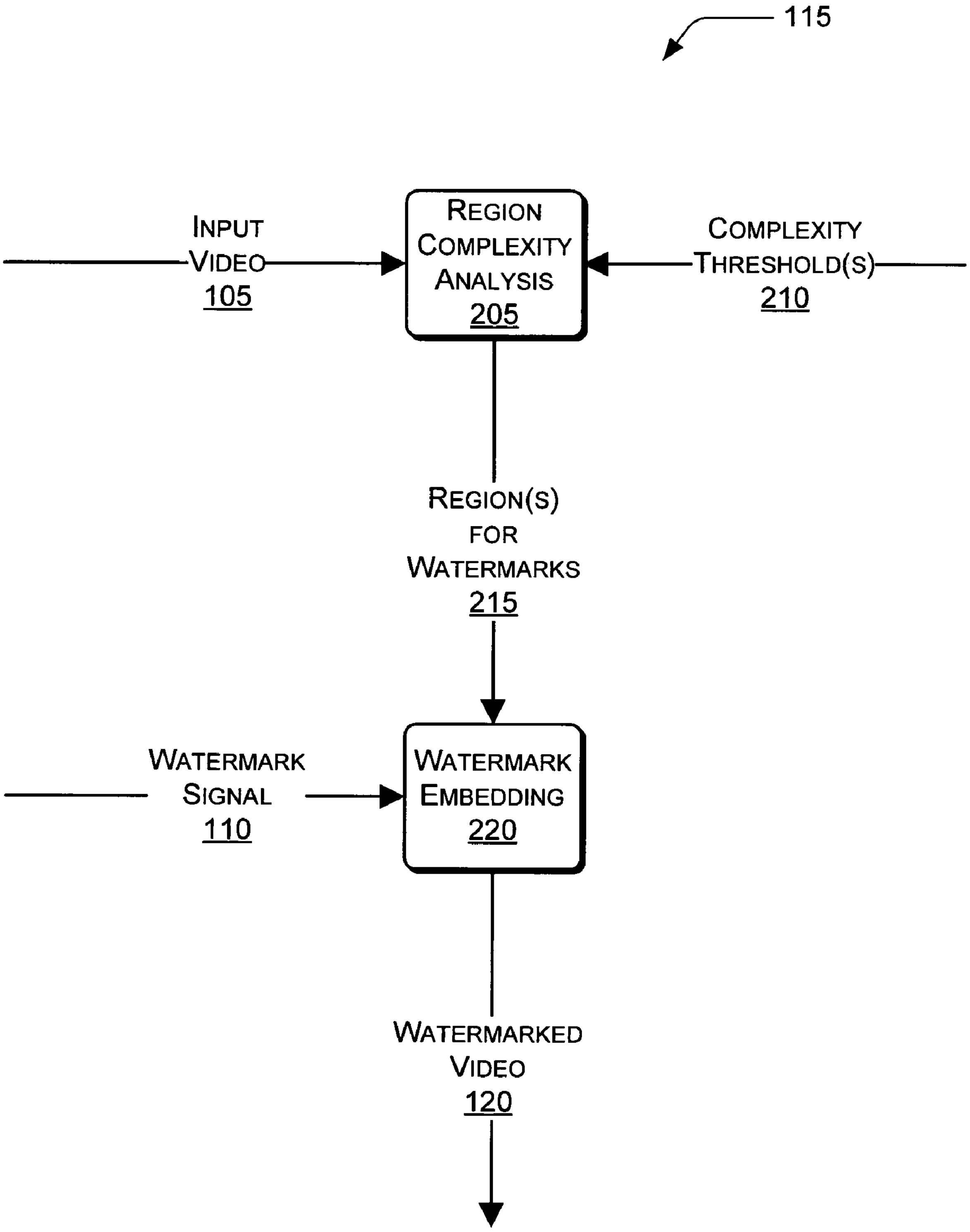
FIG. 2 is a block diagram of further components and data flows relating to a watermark encoder, as shown in FIG. 1.

FIG. 2 illustrates further components and data flows relating to the watermark encoder 115 shown in FIG. 1. The input video 105 is received, and then undergoes region complexity analysis, which is represented generally as region complexity analysis 205. Region complexity analysis 205 is discussed in further detail below, but in overview, the input video 105 is divided into a plurality of regions. Given one of these regions, this region is analyzed to determine whether the region is or would be a good candidate for embedding the watermark 110. Generally speaking, the more complex a given region is, the better that region is as a candidate for embedding the watermark 110. A threshold 210 specifying the minimum complexity level appropriate for embedding the watermark 110 in a given region can be received. Those regions satisfying the complexity level threshold 210 are output from the region complexity analysis 205 as regions 215. It is understood that any given input video 105 could contain one or more regions 215 that are suitable for watermarking. It is also possible that a given input video 105 does not contain any regions that are suitable for watermarking.

The regions 215 that are output from the region complexity analysis 205 are routed to a watermark embedding process 220. The watermark embedding process 220 is described in further detail below, but, in overview, it receives the input watermark 110 and embeds or encodes the watermark 110 onto the regions 215 received from the region complexity analysis 205. The output of the watermark embedding process 220 is the watermarked video 120.

Figure 3:
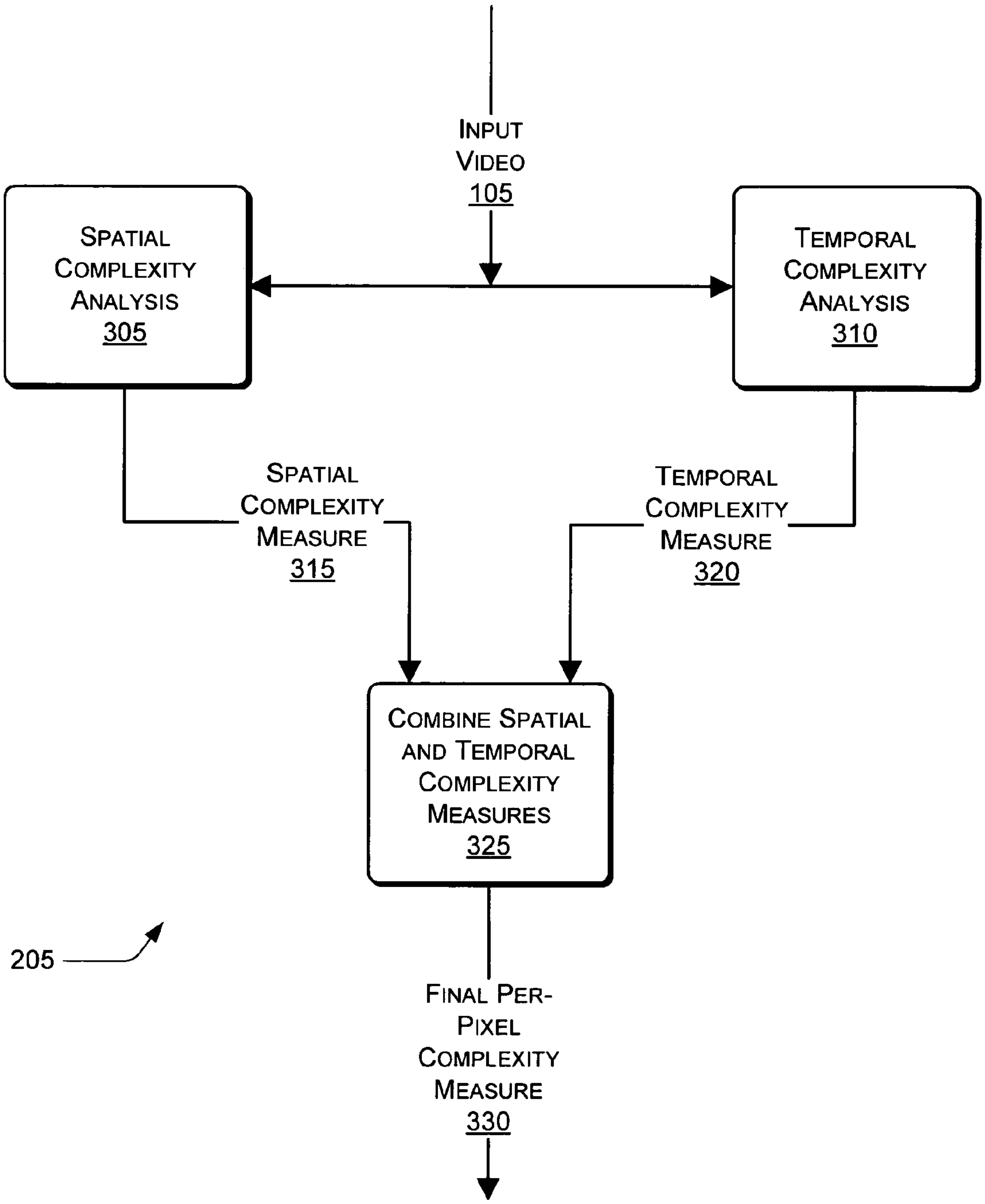
FIG. 3 is a block diagram of further components and data flows relating to analyzing complexity of regions of video, as shown in FIG. 2.

FIG. 3 illustrates further components and data flows relating to the region complexity analysis 205, which was introduced in FIG. 2. As discussed above, one step in embedding the watermark 110 is to determine which regions 215 of an input video 105 are complex enough to invisibly hold the watermark 110. These regions 215 can be identified by analyzing the video 105, for example, using the region complexity analysis 205. The region complexity analysis 205 can include a spatial complexity analysis 305 and a temporal complexity analysis 310. In overview, the spatial complexity analysis 305 outputs a measure 315 indicating how spatially complex the input regions 215 are (spatial complexity is determined via analyzing the pixels within a frame), while the temporal complexity analysis 310 outputs a measure 320 indicating how temporally complex the input regions 215 are (temporal complexity is determined via analyzing the relationship between the pixels that belong to different frames). The spatial complexity measure 315 and the temporal complexity measure 320 are input to a combining process 325, which combines the measures 315 and 320 to produce a final complexity measure 330.

Now turning to the region complexity analysis 205 in more detail, the analysis 205 can be based on a statistical video model that provides spatial and temporal entropy rates in a DC sub-band portion of the input video 105. A region 215 that exhibits sufficiently high entropy rates may be sufficiently complex to embed the watermark 110 without being detected by a viewer, or otherwise unduly interfering with the perception of the video 105. Therefore, the spatial complexity measure 315 and the temporal complexity measure 320 of given regions 215 may be estimated based on their spatial and temporal entropy rates. The spatial and temporal entropy rates associated with the regions 215 can be linearly combined by, for example, the combination process 325, and analyzed on a per-pixel basis. Hence, the complexity analysis taught herein may be characterized as analyzing the complexity of the regions 215 on a pixel-wise basis.

Before discussing further the statistical model of the video 105 that facilitates the complexity analysis 205, it is beneficial to introduce the concept of a motion field.

Motion Field and Motion Vectors

Figure 4:
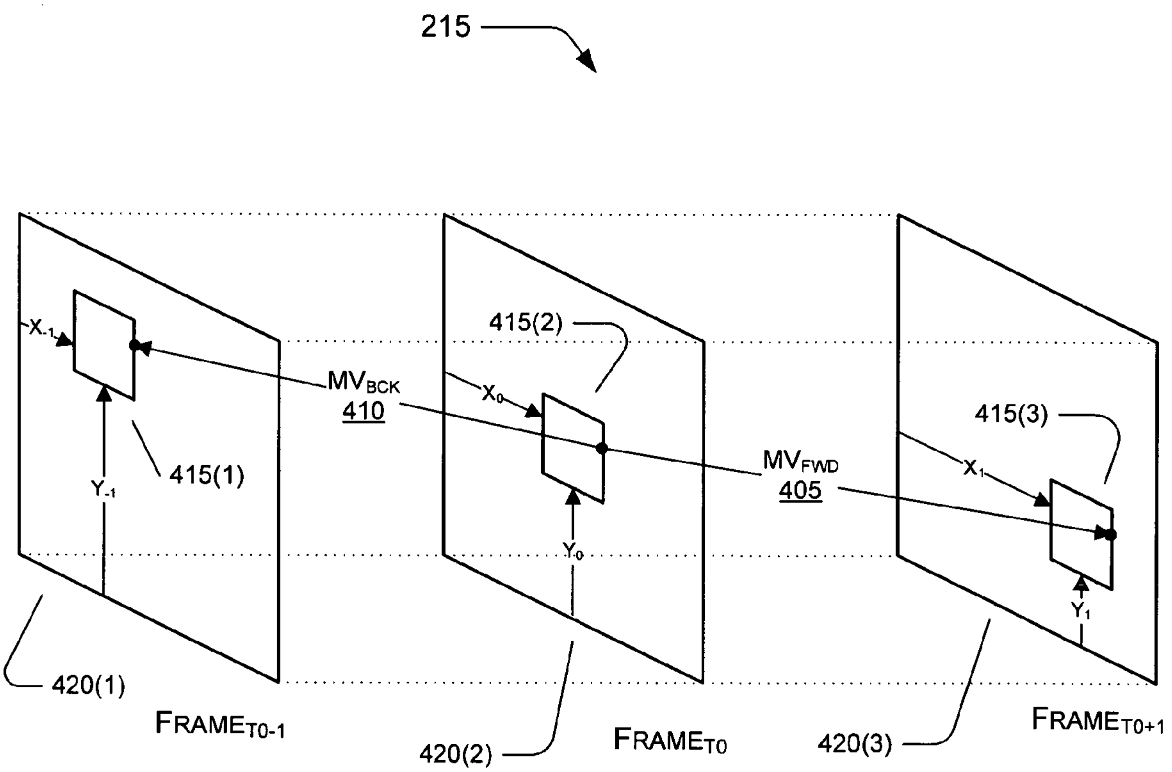
FIG. 4 is a diagram illustrating motion vectors as described herein, shown in the context of tracking a given pixel across an illustrative sequence of three consecutive video frames.

FIG. 4 illustrates motion vectors 405 and 410 as described herein, shown in the context of tracking a given pixel 415 across an illustrative sequence of, for example, three consecutive video frames 420 within an illustrative but non-limiting region 215. It is emphasized that FIG. 4 is not to be understood as limiting a region 215 to three video frames 420. Instead, FIG. 4 includes three video frames 420 only for convenience of discussion and illustration.

For convenience, the video frames 420 are referenced individually as frames 420(1), 420(2), and 420(3), and collectively as frames 420. Likewise, the pixel 415 is referenced as pixel 415(1) as shown within frame 420(1), is referenced as pixel 415(2) as shown within frame 420(2), and is referenced as pixel 415(3) as shown within frame 420(3). Collectively, the pixels 415(1), 415(2), and 415(3) are referenced as pixels 415. In the context of the discussion herein, it can be assumed that the pixel 415 may represent, at least in part, a given point of interest within the video 105. As a non-limiting example, the pixel 415 may be part of an actor walking across a scene.

Unlike a three-dimensional dataset, such as magnetic resonance imagery (i.e., MRIs), in video, behavior along the temporal axis may be radically different than behavior along the spatial axis. The pixels on two frames 420 of a video are correlated spatially and along the motion vectors whereas pixels in MRI are correlated according to 3D neighborhood.

Video coders may exploit this phenomenon by using motion vectors. Due to compression efficiency considerations, most state-of-the-art video coding standards use block-based motion vectors. However, since the teachings herein are not limited by compression efficiency, motion vectors 405 and 410 can be utilized at the pixel level, rather than the block level. Furthermore, the teachings herein can use motion vectors 405 and 410 in, for example, a discrete wavelet transform (DWT) direct current (DC) sub-band, instead of in an untransformed domain. This approach may be characterized as processing a spatially down-sampled video.

Defining the motion vectors 405 and 410 in more detail, let $p(t_0, C_0)$ denote a given pixel 415(2) on the frame 420(2) $F_{t0}$ at coordinates $C_0$ in the DC sub-band. Note that $C_0$ can be expressed as two-dimensional coordinates $(x_0, y_0)$. Although there may be concerns such as pixel occlusion between consecutive frames 420, one can typically assume that this given pixel 415(2) exists in frames 420(1) $F_{t0-1}$, and 420(3) $F_{t0+1}$. Also, assume that an algorithm can find the corresponding pixel 415(3) on the next frame 420(3), represented as $p_n(t_0+1, C_n)$. Assume also that this algorithm can find the corresponding pixel 415(1) on the previous frame 420(1), represented as $p_p(t_0-1, C_p)$. Here, a vector representing the difference between the coordinates $C_n-C_0$ may be referred to as a forward motion vector 405 ($MV_{fwd}(t_0, C_0)$). Additionally, a vector representing the difference between the coordinates $C_p-C_0$ may be referred to as a backward motion vector 410 ($MV_{bck}(t_0, C_0)$).

The algorithm that finds the motion vectors 405 and 410 can be block based or optical flow based. Block based motion estimation techniques may be used in video compression. The idea is to "match" a block of interest in the current frame to the best match in the neighboring frame. Therefore, for a given block of interest in the current frame, a block matching algorithm may find the "closest" block to it in the neighboring frame in the sense of a preferred distortion metric. The distortion metrics used for this purpose are typically L2 norm (Euclidean norm) or L1 norm (corresponds to sum of absolute differences).

Optical-flow based motion estimation techniques result from a different approach, namely constant intensity assumption. This assumption yields the result that the luminance of a moving point does not change much between neighboring frames. Mathematically, this can be represented as f(x+dx, y+dy, t+dt)=f( x, y, t), where f(x,y,t) denotes a three dimensional representation of video (the first, second and third dimensions are spatial horizontal, spatial vertical and temporal directions, respectively). Applying Taylor expansion to the left hand side yields the famous optical flow equation:

$$(\nabla f)^T \cdot v + \partial f/\partial t = 0,$$

where $\nabla f=[\partial f/\partial x, \partial f/\partial y]^T$ is the spatial gradient of the video f(x,y,t) and $v=[\partial x/\partial t, \partial y/\partial t]^T$ is the motion vector In practice, in optical flow methods, the goal is to find motion vector v at each location (x,y,t) to minimize $7(\nabla f)^T \cdot v+\partial f/\partial t7$.

Cumulative Motion Vectors

Figure 5:
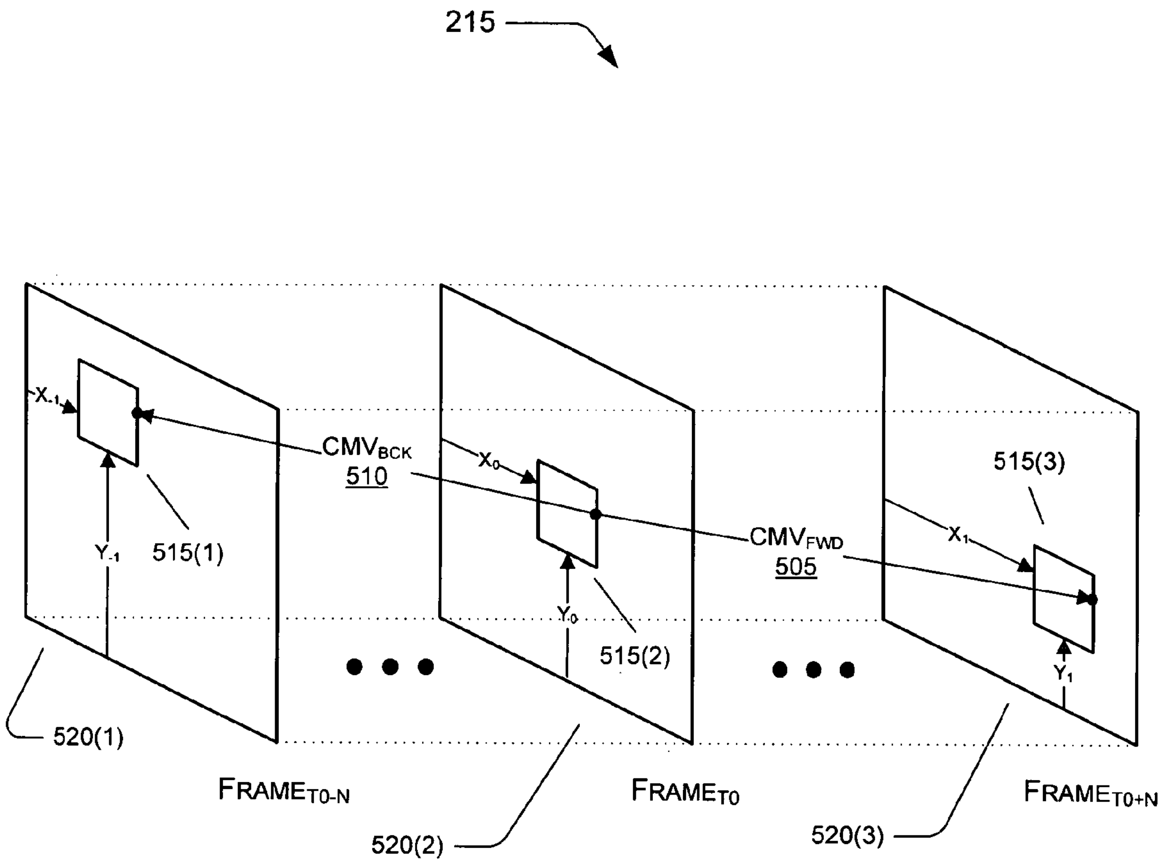
FIG. 5 is a diagram illustrating cumulative motion vectors as described herein, shown in the context of tracking a given pixel across an illustrative sequence of video frames.

FIG. 5 illustrates cumulative motion vectors 505 and 510 as described herein, shown in the context of tracking a given pixel 515 across an illustrative sequence of video frames 520. As above in FIG. 4, the pixels 515 are referenced collectively as pixels 515, and severally as pixels 515(1), 515(2), and 515(3). Likewise, the video frames 520 are referenced collectively as video frames 520, and severally as video frames 520(1), 520(2), and 520(3).

Consider an example of tracking a given pixel 515(2) $p(t_0, C_0)$ in a video frame 520(2) for N frames into the future, and determining the spatial coordinates of that pixel 515 as the video 105 advances through those N frames. The spatial coordinates of that pixel 515 through the N frames may be denoted as the coordinates $C_f$ of the pixel $p_n(t_0+N, C_f)$. For convenience, the final or N-th frame is referenced as frame 520(3), and the pixel 515 within the frame 520(3) is referenced as pixel 515(3). A vector representing the movement of the given pixel 515 between the coordinates $C_f-C_0$ as the video 105 is advanced N frames may be referred to as a cumulative forward motion vector 505 ($CMV_{fwd}(t_0, C_0, N)$). A similar vector representing the movement of the given pixel between the coordinates $C_p-C_0$ as the video is reversed N frames may be referred to as a cumulative backward motion vector 510 ($CMV_{bck}(t_0, C_0, N)$).

Since these motion vectors 405 and 410 (MVs) and cumulative motion vectors 505 and 515 (CMVs) are not necessarily integer valued, error accumulation may be prevented by using error diffusion in computation of the MVs and CMVs. Further, sub-pixel accuracy (i.e. floating point numbers) may be used in computing and storing the MVs and CMVs.

Having described the motion field, and defined the related concepts of the motion vectors 405 and 410 and cumulative motion vectors 505 and 515, the spatial complexity analysis 305 shown in FIG. 3 is now described in more detail.

Spatial Dependencies

Figure 6:
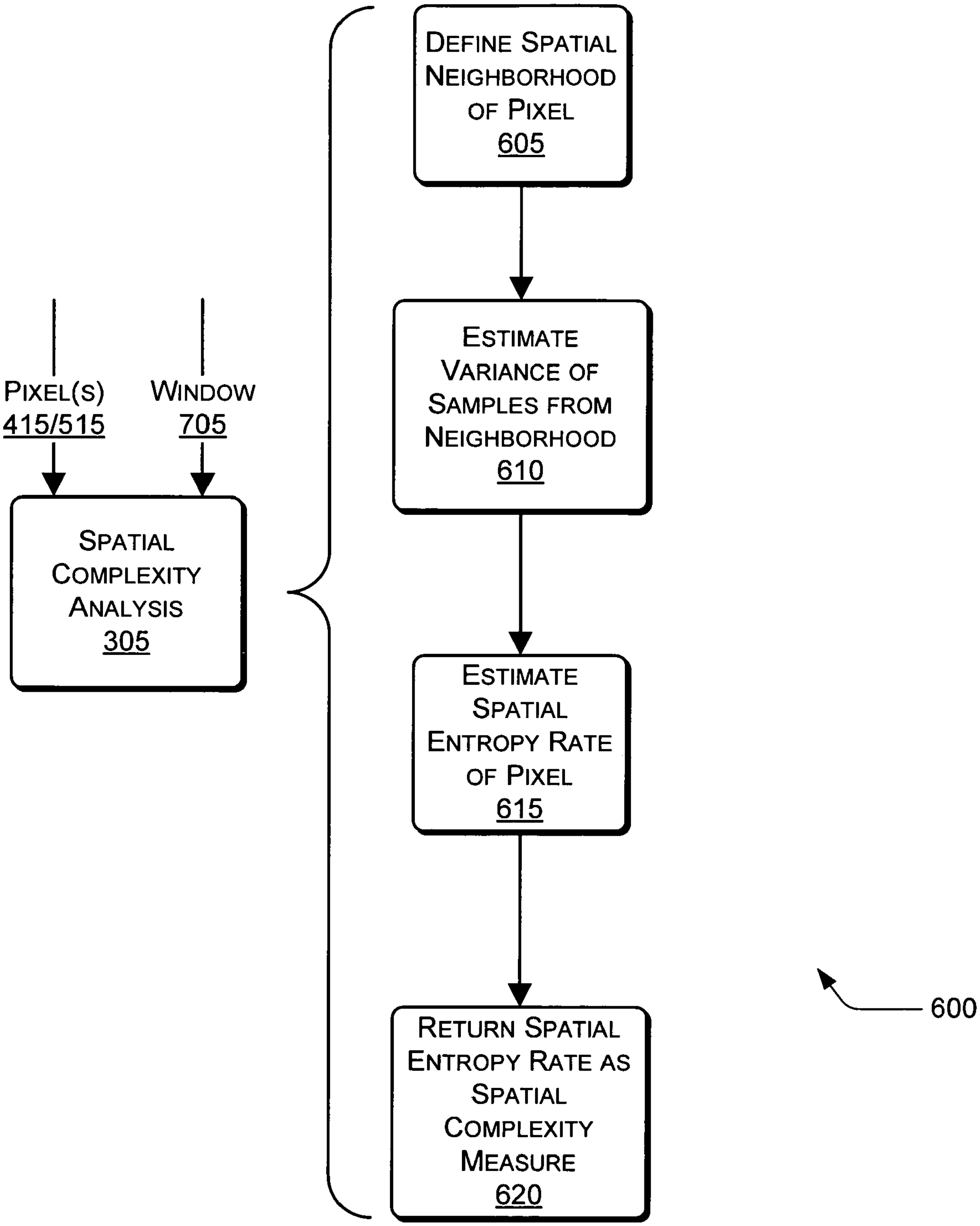
FIG. 6 is a flow diagram illustrating a process flow for performing spatial complexity analysis, as shown in FIG. 3.

FIG. 6 is a flow diagram illustrating a process flow 600 for performing spatial complexity analysis 305, as shown in FIG. 3. In block 605, a spatial neighborhood relative to a given pixel is defined. The given pixel can be, for example, the pixel 415 as shown in FIG. 4 in the frames 420, or the pixel 515 as shown in FIG. 5 in the frames 520. For convenience, this given pixel around which the neighborhood is defined is referenced as pixel 415/515. For more detail on defining the spatial neighborhood, FIG. 7 is now described.

Figure 7:
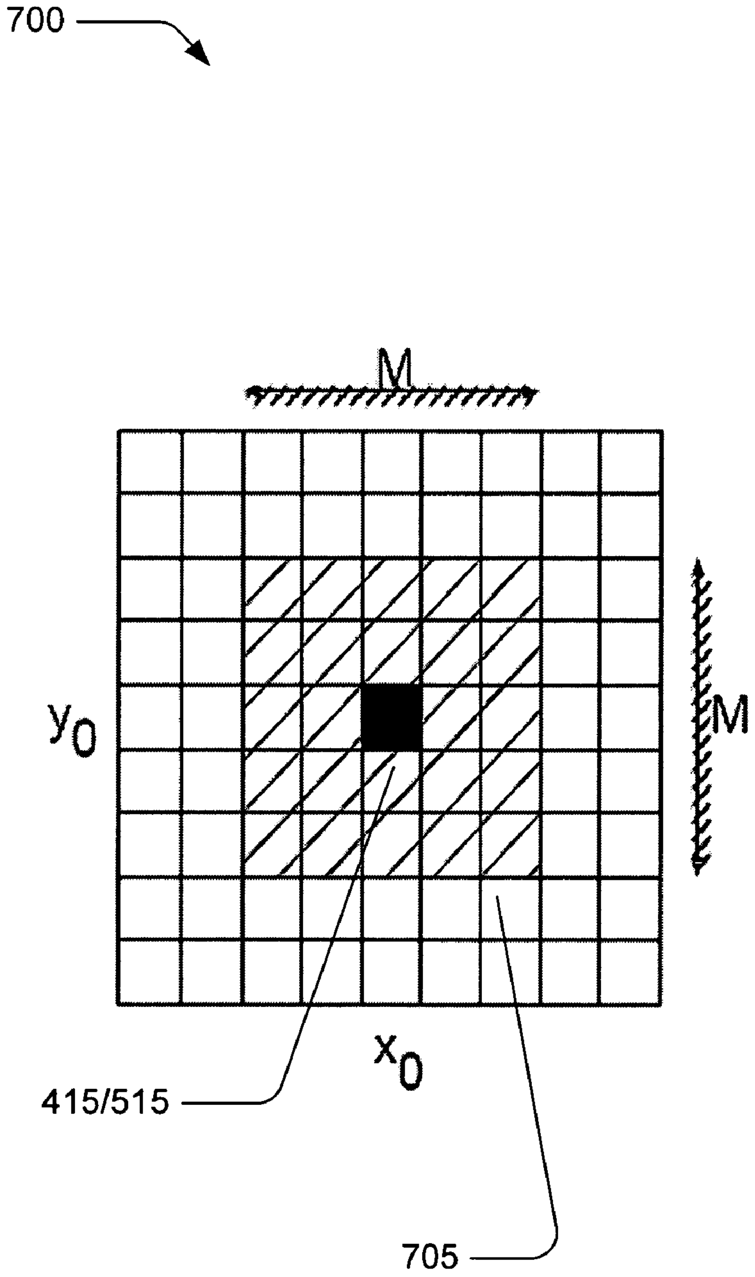
FIG. 7 is a block diagram illustrating a spatial neighborhood of a given pixel, suitable for facilitating the spatial complexity analysis, as shown in FIGS. 3 and 6.

FIG. 7 illustrates a spatial neighborhood 700 of the given pixel 415/515. The pixel 415/515 can appear, for example, in a DWT DC-subband. Assume that a window 705 of neighboring pixels is defined around the given pixel 415/515. As shown in FIG. 7 for illustration, but not limitation, the window 705 is illustrative size of M×M, although the window 705 can take any convenient size, shape, or dimension relative to the given pixel 415/515. Assume that the pixels neighboring the given pixel 415/515 in the DC sub-band are characterized by an approximately i.i.d. (independent identically distributed) Gaussian distribution. In FIG. 7, the given pixel 415/515 is marked black, and the M×M window 705 is shaded. In implementations, an illustrative size of M=5 may be suitable for the window 705.

Returning to FIG. 6, in block 610, to determine the spatial complexity ($C_s$) at the pixel 415/515 in the DC sub-band, the variance of the samples in the M×M window 705 can be estimated by relying on the above i.i.d. assumption. For $p(t_0, C_0)$, the samples are $$p(t_0, C_0 + (c, d))s:t:(c, d) \in \left\{\frac{-(M-1)}{2}, \ldots, \frac{(M-1)}{2}\right\}^2.$$

In block 615, using the Gaussian entropy formula $C_s=\frac{1}{2}\log 2\pi e\sigma^2$, (here $\sigma^2$ is the variance of the samples in the spatial neighborhood of the coefficient of interest) the spatial entropy rate of the given pixel 415/515 can be estimated. In block 620, the spatial entropy rate can be returned for use as a measure 315 of the spatial complexity of the pixel 415/515.

Temporal Dependencies

Figure 8:
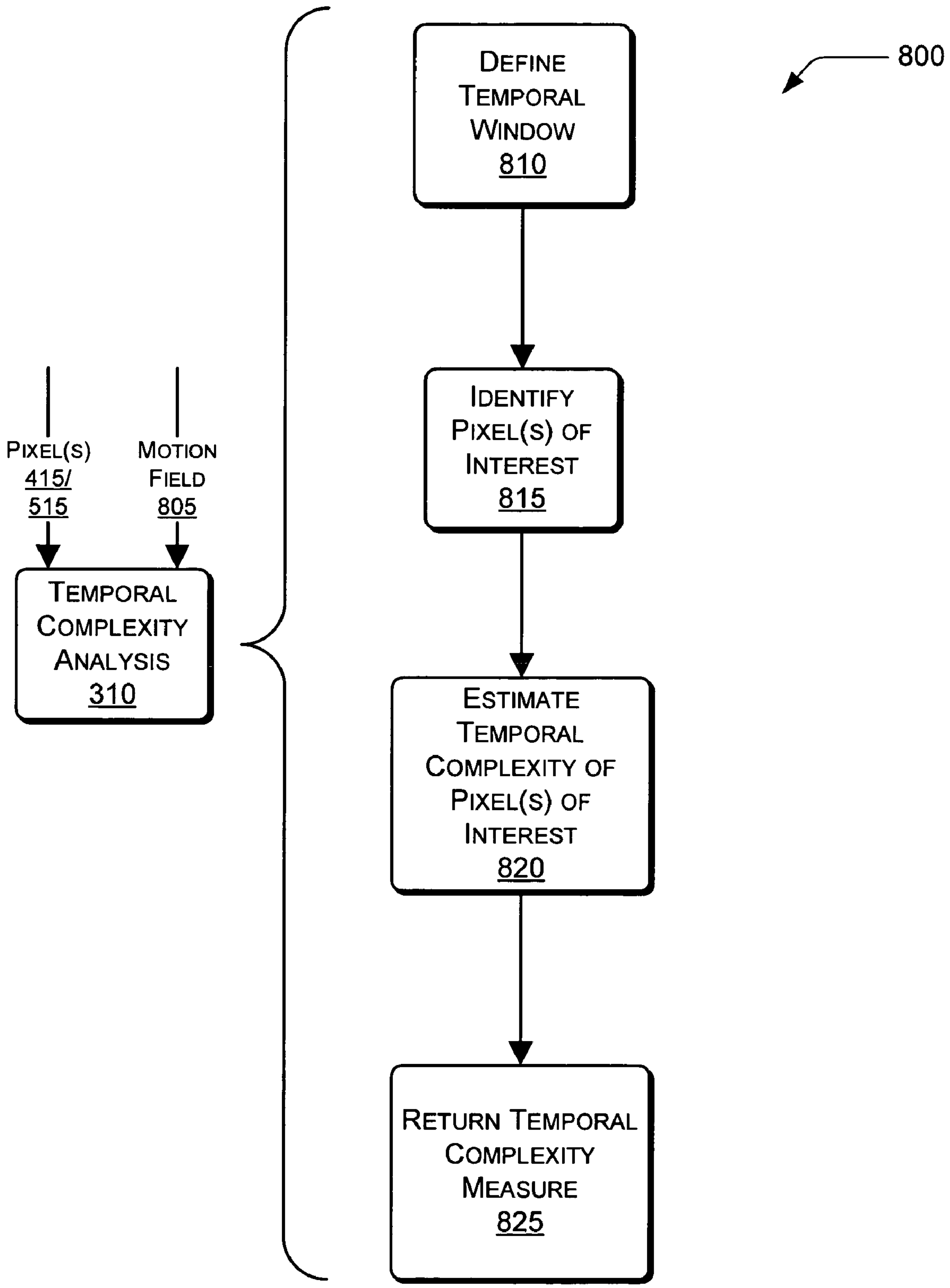
FIG. 8 is a flow diagram illustrating a process flow for performing temporal complexity analysis, as shown in FIG. 3.

FIG. 8 illustrates a process flow 800 for performing the temporal complexity analysis 310 as shown in FIG. 3. Given a pixel 415/515 in the DC subband, and given a motion field 805 associated with that pixel 415/515, it can be assumed that in the direction of the motion field 805, the movement of the pixel 415/515 can be modeled using a Gauss-Markov process. For convenience, the motion field 805 corresponds to the motion vectors 405 and 410 and/or the cumulative motion vectors 505 and 515.

In block 810, a temporal window related to the pixel 415/515 is defined. Assume that the temporal window of interest is of a length L. In implementations, an illustrative length of interest (L)=11 may be suitable. Furthermore, in the developments below, without loss of generality assume L is odd (the analysis and developments can be extended to the case of even L without any difficulty).

In block 815, one or more given pixels of interest are identified. Assume that this given pixel is the pixel 415/515. For the given pixel 415/515 $p(t_0, C_0)$, the corresponding pixels in the motion field 805 are given as $$p(t_0+t,\ C_0+CMV(t_0;\ C_0;\ t)),\ t\in\left\{\frac{-(L-1)}{2},\ \ldots\ ,\ \frac{(L-1)}{2}\right\}.$$

Depending on the sign of t, one can use the cumulative motion vector 505 $CMV_{fwd}$ if t>0, and can use the cumulative motion vector 515 $CMV_{bck}$ if t<0.

In block 820, the temporal complexity of the pixel(s) of interest is estimated. To provide more detail on an illustrative method for performing the processing represented in block 820, FIG. 9 illustrates a process flow 900 for estimating the temporal complexity of the pixel(s) processing performed in block 820.

Figure 9:
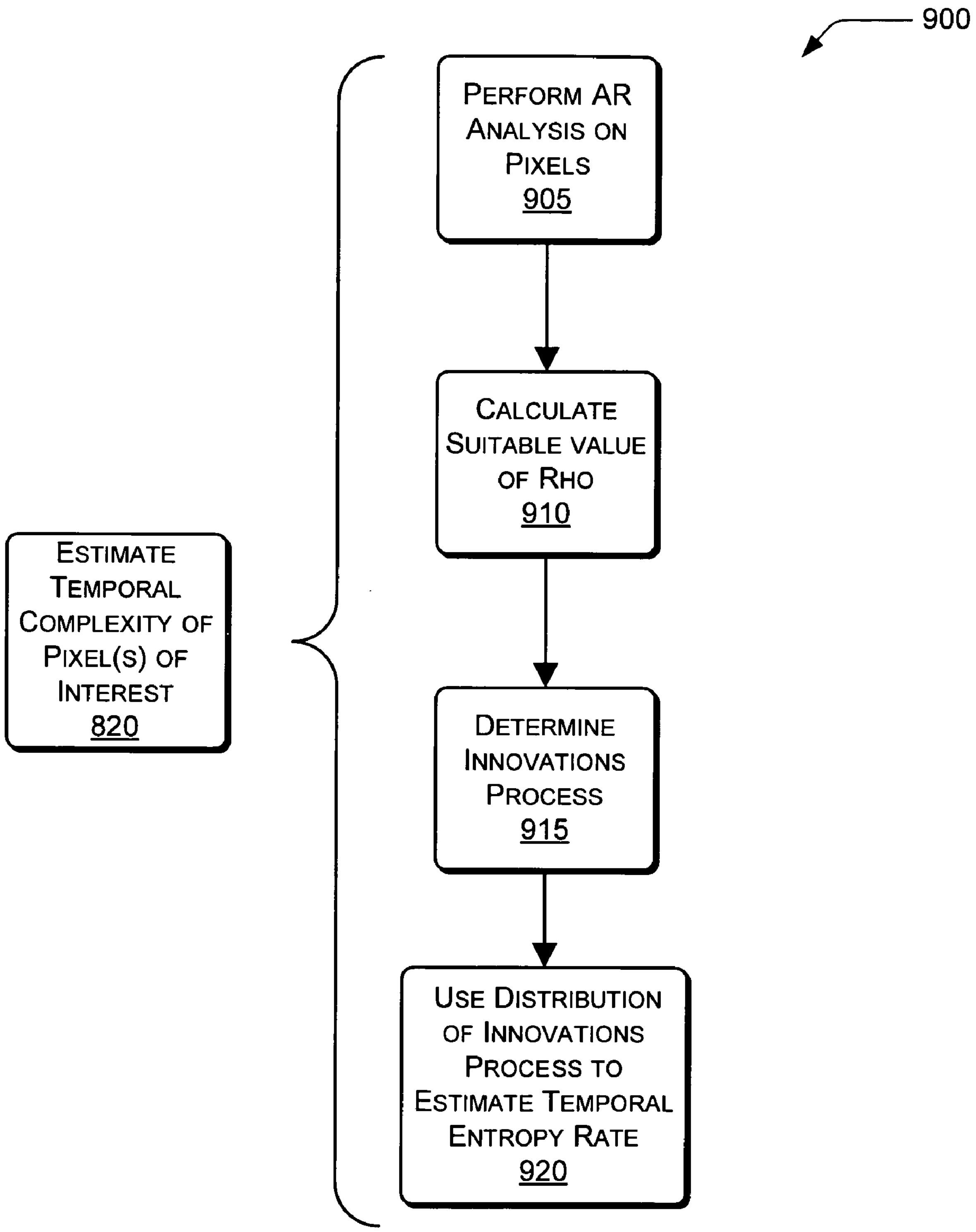
FIG. 9 is a flow diagram illustrating a process flow for estimating the temporal complexity of pixels, as shown in FIG. 8.

Turning now to FIG. 9, in block 905, to determine the temporal complexity ($C_t$), an analysis based on a 1st order Gaussian auto-regressive (AR) model can be performed among the corresponding pixels, as follows: $p(t_0+t, C_0)=\rho p(t_0+t-1, C_0+CMV(t_0, C_0, t))+g(t)$, where $g(t)\sim N(0, \sigma^2)$; furthermore $\{g(t)\}$ are independent of each other for different t. As above, depending on the sign of t, one may use $CMV_{fwd}$ or $CMV_{bck}$.

In block 910, for each pixel 415/515, the value of ρ is estimated that minimizes the Euclidean norm of the error; this estimate is also known as the least-squares estimate. In block 915, the calculated value of ρ can then be used to determine the innovations process g( ).

In block 920, again from the Gaussian entropy rate formula, the temporal complexity ($C_t$) can be found using the distribution of the innovations process g( ).

Returning to FIG. 8, in block 825, the measure 320 of the temporal complexity ($C_t$) can be returned. The temporal complexity ($C_t$) can be estimated using, for example, the process flow 900 shown in FIG. 9.

Combined Complexity

Turning briefly to FIG. 3, particularly block 325 thereof, the spatial complexity ($C_s$) and the temporal complexity ($C_t$) may be combined linearly, with the result being used as the final per-pixel complexity 330 ($C_f$). The final per-pixel complexity 330 ($C_f$) may be calculated as follows: $C_f=\alpha C_s+\beta C_t$. The coefficients α and β can be chosen experimentally using, for example, a heuristic approach.

It is noted that the additive method described above for computing the final per-pixel complexity 330 ($C_f$) is illustrative and not limiting. Other alternatives, such as multiplicative combinations of the spatial complexity ($C_s$) and the temporal complexity ($C_t$), can be implemented. For example, the final per-pixel complexity 330 ($C_f$) may be computed as $C_f=C_s^{\alpha}C_t^{\beta}$, depending on particular applications.

Returning briefly to FIG. 2, recall that the input video 105 is divided into a plurality of candidate regions into which the watermark 110 may be embedded. The final per-pixel complexity 330 ($C_f$) of all the pixels in a given candidate region can be combined and compared to the complexity threshold 210. If the final combined per-pixel complexity 330 ($C_f$) meets or exceeds the complexity threshold 210, the given region of the video can be sent to the watermark embedding process 220 as a region 215 suitable for embedding the watermark 110.

Region Selection

Candidate regions can be randomly selected in time. One illustrative criterion in selecting the regions 215 is to consider scene-cuts in the input video 105, such that the selected region 215 does not overlap with any of the scene-cuts. Once such a region 215 (Ri) is selected, the complexity analysis 205 as described above can be performed. The per-pixel complexity 330 $C_f(t, C)$ can be calculated at all pixels from $t_{Ri}$ to $t_{Ri}+T$. with the coordinates $C\in\{(0, 0), \ldots, (W. H)\}$, where W is the width and H is the height of a frame in the DWT DC band.

For future use, the per-pixel complexity 330 $C_f$ can be stored. To prevent visual artifacts, and for security purposes, a modified version of $C_f$ such that $\hat{C}_f=LF(C_f\times N_{Ku})$ can be used, where $N_{Ku}$ is a noise field with mean 1.0 securely generated from key Ku, and where LF( ) is the low pass filtering operator. Finally, in some implementations, $\hat{C}_f$ can be clamped between 0 and $C_{fmax}$.

The combined complexities 330 can be thresholded and counted for all pixels in the region $R_i$: ∀(t, C), if $\hat{C}_f(t, C)>C_{thresh}$=>increment ($Count_{Ri}$). If ($Count_{Ri}<\alpha\times T\times W\times H$), then the region Ri can be considered unsuitable for marking. Otherwise, the process 220 of embedding the watermark 110 in the region 215 Ri can proceed. The parameter $\alpha\in(0, 1)$ can be experimentally determined.

Embedding the Watermark

Figure 10:
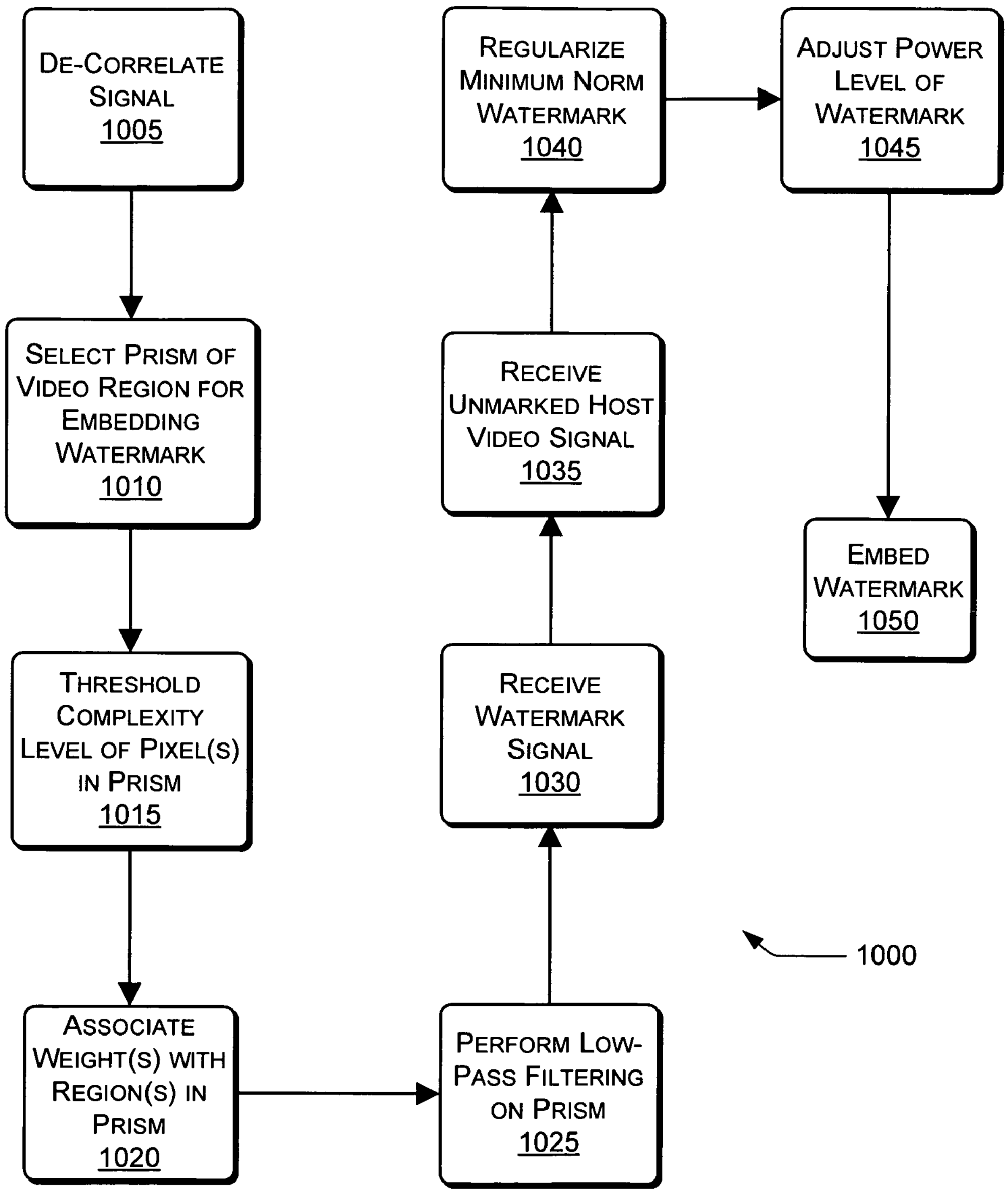
FIG. 10 is a flow diagram illustrating a process flow suitable for embedding a watermark into selected regions of an input video.

FIG. 10 illustrates a process flow 1000 suitable for embedding the watermark 110 into the selected regions 215 of the input video 105. The watermark 110 may be embedded in the video 105, for example, by changing the statistics of groups of pixels in the DWT DC subband. Any change in the DC subband is reflected on the untransformed domain and in the watermarked video 120. The "group of pixels" can correspond to a T-frame region of video from time $t_{Ri}$ to $t_{Ri}+T$, for a given region Ri.

De-Correlation Transform

To be more robust against attacks, the watermark embedding process 220 can work on an approximately de-correlated version of the video signal. The signal de-correlation process is represented in FIG. 10 by the block 1005. For this purpose, a two-dimensional DWT along the spatial axes can be used. It is noted that de-correlation along the time axis can be handled in a different way by using the motion field of the video.

Figure 11:
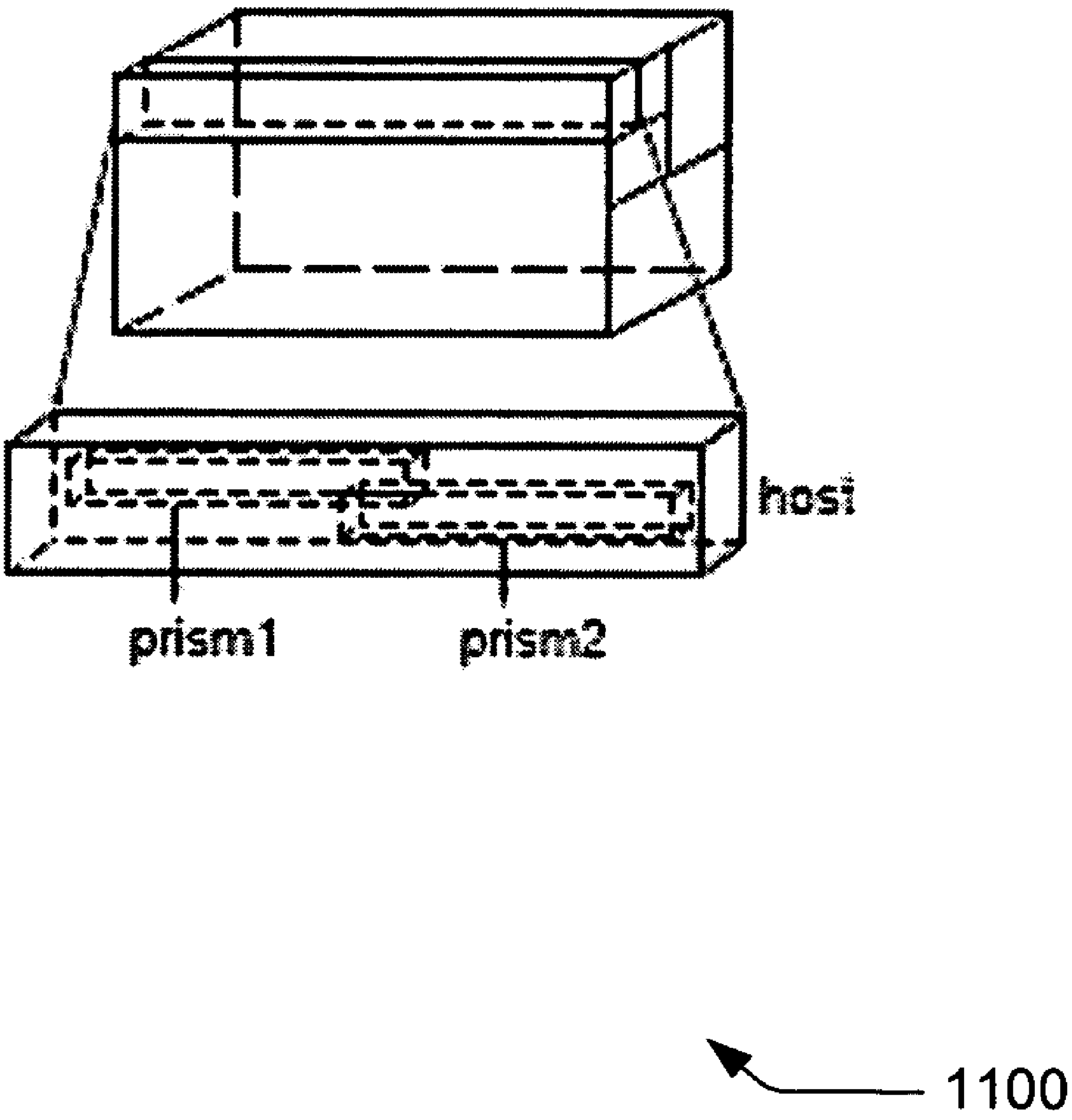
FIG. 11 is a block diagram illustrating a host segment from an input video, featuring two prisms shown within the host segment.

FIG. 11 illustrates a host segment from an input video, featuring two prisms shown within the host segment. Each video frame can be DWT decomposed into $N_1$ levels on the vertical axis and into $N_2$ levels on the horizontal axis. As shown in FIG. 11, the lowest frequency (DC) sub-band 1100 is selected for mark embedding.

Prism Selection and Thresholding

In block 1010, a prism that corresponds to a feature is pseudo-randomly selected within the DWT's DC sub-band 1100, as shown in FIG. 11. Let $Pr_i$ denote the ith prism, let $Pr_{isz}$ denote the size of the prism $Pr_i$, and let $Pr_{iloc}$ denote the location of the prism $Pr_i$, s.t. $i\in\{1, \ldots, M)$, with M being the number of features or prisms. It is noted that $Pr_{iloc}$ and $Pr_{isz}\in Z^3$.

Complexity mapping can be used during the prism selection process, as described now. In block 1015, the complexity level of each pixel in a given prism can be thresholded. In the given prism, if the total number of pixels whose statistical complexities exceed this threshold is less than a certain percentage ($P_{pass}$) of the total pixels, the given prism is discarded. This process allows the mark embedding process to discard undesired regions of the video, i.e., low complexity regions that do not have enough entropy to visually and securely hide the mark.

In some implementations of the teachings herein, an illustrative size of the prisms can be chosen as about 40% of the host. The term "host" refers to the unmarked video signal 105 throughout this description). The percentage $P_{pass}$ can be chosen as 50% and the threshold can be chosen as equal to $C_{fmax}/2$.

Weight Generation

In block 1020, weights are associated with the regions in the prism. Then, a statistic is computed for each prism using the weights assigned to that prism; the statistic of a given prism is a weighted linear combination of the coefficients inside that prism and the assigned weights are used in obtaining this linear combination. Then, the statistic of each prism is quantized to a secret lattice (potentially a different lattice for every prism). Then, a watermark is designed such that, when it is added to the unmarked signal (host), the statistics of the resulting signal sum are exactly equal to the quantized versions of the statistics of the unmarked host; the resulting sum will constitute the watermarked signal.

It can be shown that, under some mild conditions on the secret weights, there are infinitely many watermark solutions that satisfy this criterion (i.e., the criterion that the statistics of the watermarked signal need to be exactly equal to the quantized versions of the statistics of the unmarked signal); the one, which is minimum in its Euclidean norm, is called the "minimum norm" solution. The minimum norm solution determines the general nature of the embedded watermark and one can show that the embedded watermark will behave according to the utilized weights (this is because of the fact that the minimum-norm solution consists of a linear combination of the rows of the weight matrix). For example, if the weights in a region are constant, then the minimum norm solution will be constant in that region. This behavior can separately be observed in the temporal and spatial domains. By looking at a natural video, one can generally observe the following:

i) the spatial characteristics are smoothly changing; and ii) the temporal characteristics are approximately constant (or very slowly varying) throughout the motion direction.

It is understood that both observations may not necessarily be 100% true, since abrupt edges may violate the first observation, and occlusions may violate the second observation. Nevertheless, for the purposes of the instant discussion, it is safe enough to assume that these observations will generally hold true. Furthermore, the statistical video model introduced above generally agrees with the above observations.

Therefore, it may be appropriate to select the weights so that they vary smoothly in the spatial domain and so that they stay approximately constant along the motion field in the temporal domain. Furthermore, for security purposes, it may be appropriate to include a degree of randomness in the selection of the weights. Based on these design criteria, two weight generation algorithms are described and illustrated in connection with FIGS. 11 and 12, respectively.

Figure 12:
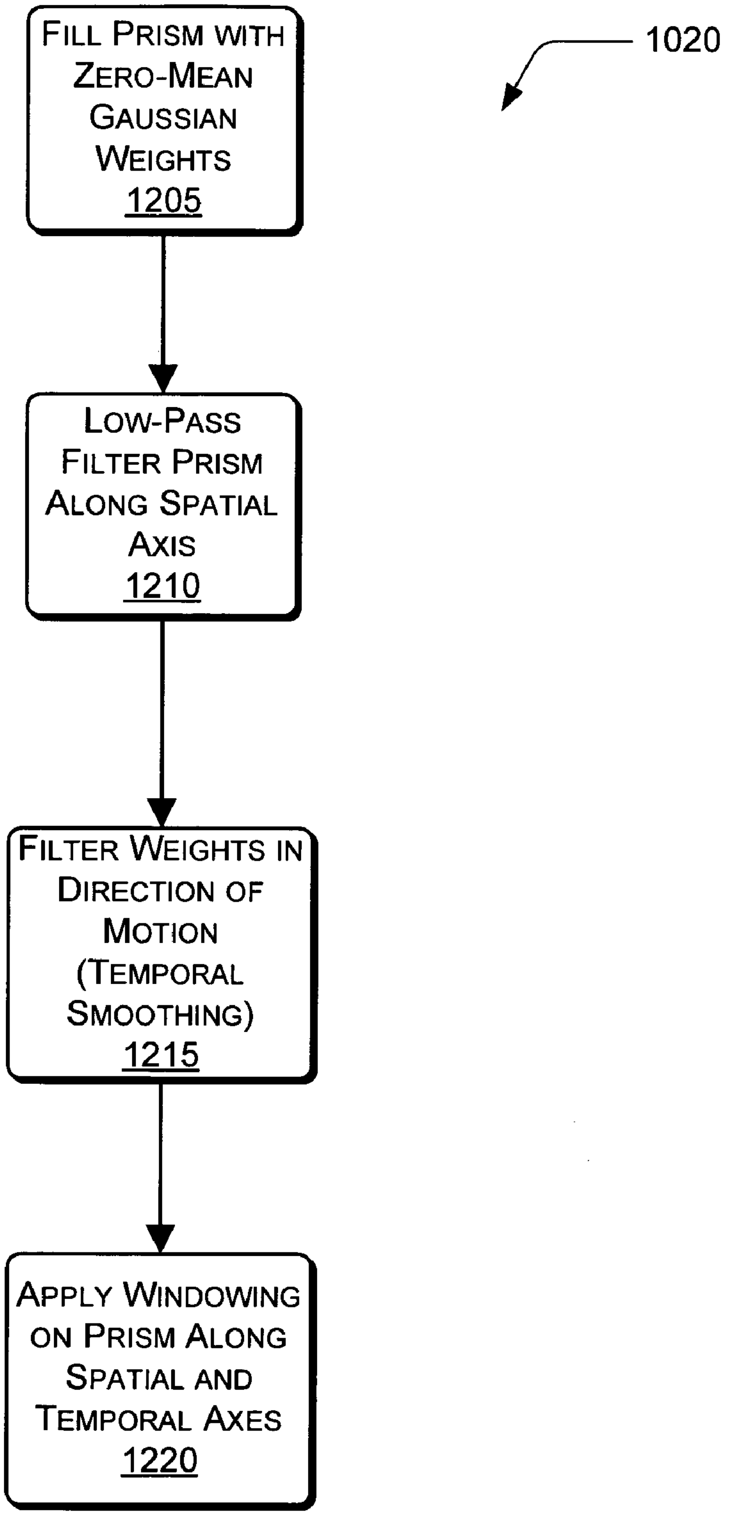
FIG. 12 is a flow diagram illustrating a process flow for a first algorithm for associating weights with regions in the prism.

FIG. 12 illustrates a process flow for a first algorithm for associating weights with regions in the prism, as represented in FIG. 10 by the block 1020. For convenience, but not limitation, the algorithm shown in FIG. 12 is referred to herein as "Algorithm I".

Algorithm I: Turning to FIG. 12, in block 1205, a given, pseudo-randomly selected 3D rectangular prism, is filled with zero-mean Gaussian weights. In block 1210, the prism is low-pass filtered with a sufficiently-low cutoff frequency along the spatial direction. This process achieves spatial smoothness. To achieve temporal smoothness, the weights can be filtered in the direction of motion, as represented in block 1215. For example, see Appendix A for details of motion-compensated filtering. After the temporal filtering, windowing can be performed on the prism, as represented in block 1220. A window, such as a Hanning window, is applied in both the spatial and the temporal directions. To ensure total decay, the ends of the window go to zero.

In some implementations, the foregoing algorithm may be suitable. In other implementations, an alternative algorithm described below and illustrated in FIG. 13 may be suitable.

Figure 13:
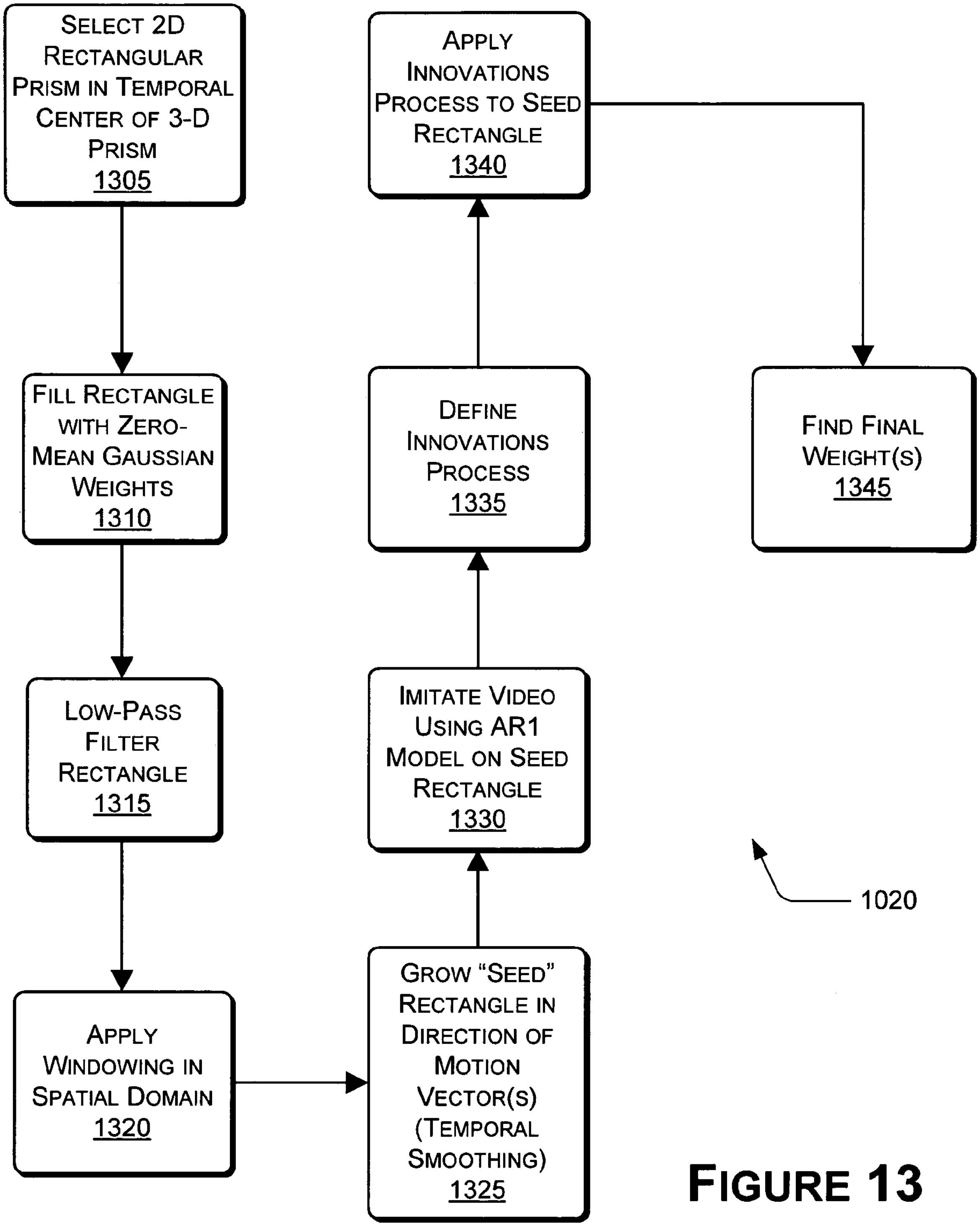
FIG. 13 is a flow diagram illustrating an alternative process flow for associating weights with regions in the prism.

FIG. 13 illustrates an alternative process flow for associating weights with regions in the prism, as represented in FIG. 10 by the block 1020.

For convenience, but not limitation, the algorithm shown in FIG. 13 is referred to herein as "Algorithm II".

Figure 14:
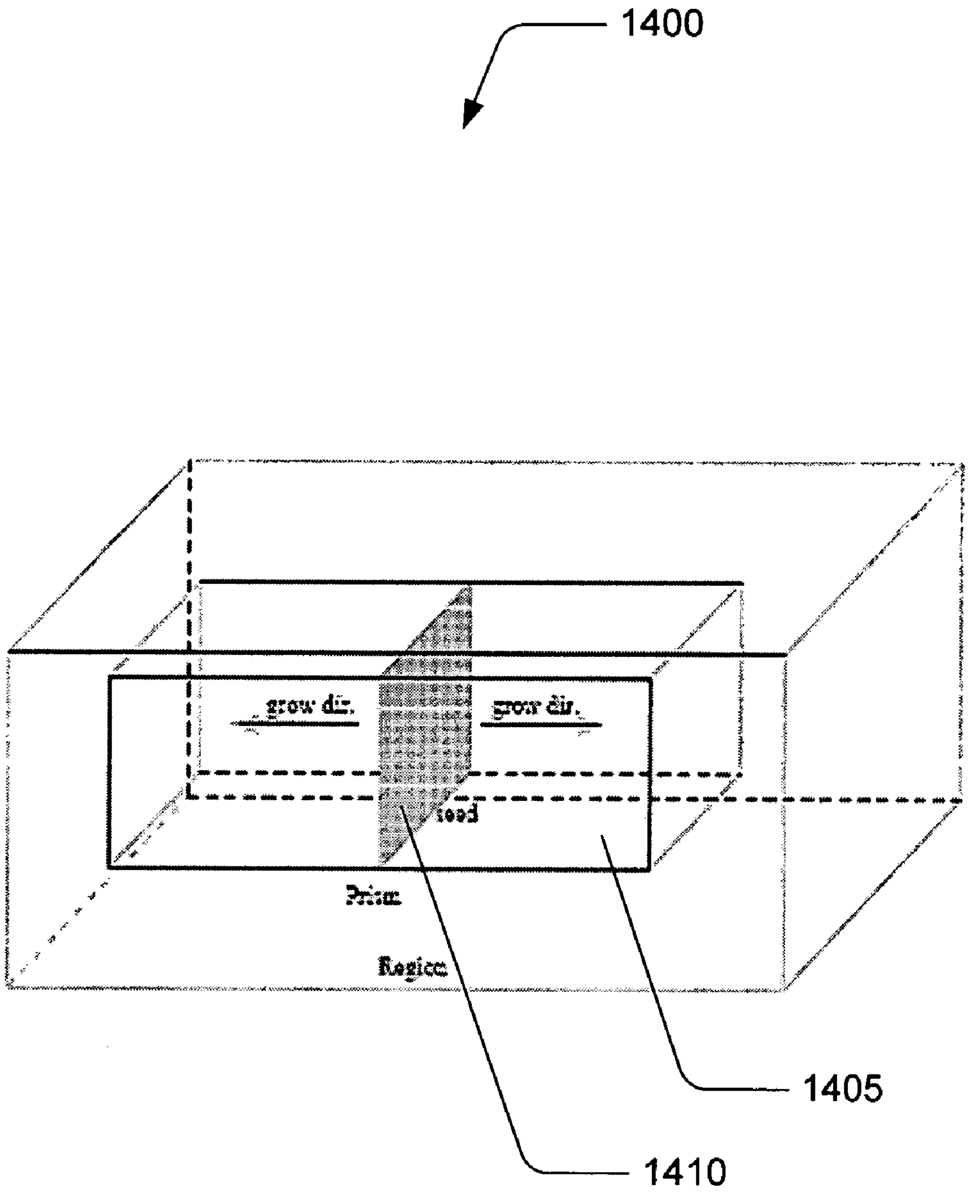
FIG. 14 is a block diagram illustrating weight generation using a seed growing algorithm.

Algorithm II: Consider FIG. 14 along with FIG. 13. FIG. 14 illustrates weight generation using a seed growing algorithm. In block 1305, to select the weights that correspond to one three-dimensional rectangular prism 1405, one can start with a pseudo-randomly selected two-dimensional rectangle 1410 in the temporal center of this prism 1405. In block 1310, this rectangle 1410 can be filled with pseudo-random zero-mean Gaussian weights. In block 1315, the rectangle can be low-pass filtered with a low cutoff frequency.

In block 1320, a windowing can be applied to achieve smoothness at the borders of the prism in the spatial domain. For convenience, but not limitation, this rectangle 1410 can be referred to as the "seed" 1410. To achieve temporal smoothness, the seed 1410 can be grown in the direction of the motion vectors, as represented in block 1325. Assume, for example, that it is desired to calculate the weight that corresponds to the location $(x_0, y_0, t_0)$. Also, assume that the seed plane is located at $(:, :, t_{mid})$. First, a seed value is determined that corresponds to the weight at $(x_0, y_0, t_0)$. This can be done using the cumulative motion vectors discussed above. If $t_0$ is greater than $t_{mid}$, the backward motion vectors can be used, and if $t_0$ is less than $t_{mid}$, the forward motion vectors can be used.

In block 1330, once the corresponding seed is found, the video model can be imitated by putting a pseudo-random (PR) AR1 Gauss-Markov model on the seed: $x(t)=\rho x(t-1)+z(t)$. A smoothly-varying $\rho$ field can be generated for use in the AR process. This field can be smoothly-varying around 1.0 as appropriate to prevent too much attenuation or amplification, since there can be as many as 70 frames in one direction. The parameter $\rho$ can be selected from, for example, a Gaussian distribution $\sim N(1, \sigma_p^2)$ every $N_p$ frames and interpolated in between. In block 1335, an innovations process z can also be defined based on a Gaussian distribution $\sim N(0; \sigma_z^2)$. Note that this process z is designed to be independent of the innovations process g that was obtained during the temporal analysis; furthermore their statistical characterization do not need to be the same. However, special cases, where z and g are correlated, may also be employed in the design. The aforementioned weight generation (or growing) mechanism can be applied to the seed to find the final weight or weights, as represented in blocks 1340 and 1345. It is noted that the above algorithm can be applied to find all weights in the prism. As an optimization, increased computational speed is possible if cumulative motion vectors are stored, and if the PR (pseudo-random) AR1 process is pre-computed.

Returning now to FIG. 10, after the weight generation process is performed in block 1020, the prism can be spatially low pass filtered (i.e., two-dimensional, per-frame filtering), as represented in block 1025. As part of this low-pass filtering, windows can be applied both temporally and spatially. In some implementations, an illustrative cutoff frequency used in the low-pass filtering in the spatial domain can be chosen as π/3.

In the spatial domain, a Hanning window can be used. The temporal window can be modified so that the peak is smoothed in the temporal axis to allow for unlocalized distribution of weights temporally. The modified temporal window can be similar to a Hanning window, except a plateau can be inserted at the peak of the window. Equations 1 and 2 below correspond to the spatial and temporal windows, respectively. L is the length of samples. In the temporal window, T is a percentage of the length L. In some implementations, an illustrative value of T=0.2×L may be used.

$$W_{spatial} = \begin{cases} \frac{1}{2}\left(1+\cos\left(\frac{\pi x}{L}\right)\right) & -L < x < L \\ 0 & \text{otherwise} \end{cases} \tag{1}$$

$$W_{temporal} = \begin{cases} \frac{1}{2}\left(1+\cos\left(\frac{\pi(x+L-T)}{T}\right)\right) & -L < x < -L+T \\ 1 & -L+T < x < L-T \\ \frac{1}{2}\left(1+\cos\left(\frac{\pi(x-L+T)}{T}\right)\right) & (L-T < x < L) \\ 0 & \text{otherwise} \end{cases} \tag{2}$$

Calculating Statistics

In block 1030, statistic $\mu_i$ can be computed for a given group i, 1<=i <=N (where N is the total number of groups) that represents the sum of the element-wise multiplications of weights and corresponding pixels in the DWT DC sub-band. Each $\mu_i$ can be quantized via a scalar uniform quantizer with step size δ. The output of the quantizer can be expressed as $\hat{\mu}_i$, 1, <=i<=N.

Embedding the Mark in the Host

In block 1035, the watermark signal 110 to be embedded in the input video 105 is defined. Let s denote the original unmarked host video 105 in the DWT DC sub-band, as received in block 1040. It is understood that the processing represented in block 1040 can occur in any order or sequence relative to the other $\hat{\mu}$ blocks shown in FIG. 10. In any event, a pseudo-randomly generated watermark signal 110 (n) is found, such that the statistics of the watermarked video signal 120 (x=s+n) are equal to $\hat{\mu}$ and ||x−s|| is minimized. First, the following Equations 3 and 4 are defined as set forth below. Here, the weights for the i-th prism are represented by $c_{ij}$. Thus, the i-th row of T, which consists of $T_{ij}$, contains the weights generated to computed the statistic of the i-th rectangle:

$$d \in R^M : d \triangleq \hat{\mu} - \mu,$$

$$T \in R^{M\times N} : T_{ij} \triangleq \begin{cases} c_{ij} & \text{if } j \in R_i \\ 0 & \text{else} \end{cases}$$

where $T$ is chosen such that $Ts = \mu$.

Let $n = x - s$. We solve

-continued $$\min_x \|x - s\| \quad s\cdot t \quad Tx = \hat{\mu} \tag{3}$$

which is equivalent to $$\min_n \|n\| \quad s\cdot t \quad Tn = d \tag{4}$$

the solution is given by $n=T^T(TT^T)^{-1}(\hat{\mu}-\mu)$.

Equation (4) is the minimum norm solution, and it may be considered optimal in the sense of the Euclidean norm. However, this does not necessarily guarantee that the watermarked video 120 provides an acceptable visual output. In order to improve perceptual quality, to enforce complexity measures in the watermark 110, and to enforce the motion behavior on the watermark 110, an iterative regularization can be applied on the minimum norm solution, which is denoted by $n_{MN}$. This regularization process is represented generally in FIG. 10 by block 1045, and discussed in more detail below.

Regularization of the Minimum Norm Watermark

Continuing with block 1045 in more detail, once the minimum norm solution $n_{MN}$ is found using the above formula, the following iterations can be applied:

1. $n_{MN}=T^T(TT^T)^{-1}d$
2. Set $n_0=n_{MN}$
3. for K steps . . .
   (a) $n_1=C(n_0)$,
   (b) $n_2=M(n_1)$,
   (c) $n_3=F(n_2)$,
   (d) $n_d=n_3-n_{MN}$
   (e) $n_n=n_d-T^T(TT^T)^{-1}Tn_d$
   (f) $n'_0=n_n+n_{MN}$
   (g) if $\|n'_0-n_0\|<\epsilon$ stop, else $n_0=n'_0$ and go to 3.a Note that step 3(e) is the projection of $n_d$ onto the nullspace of T.

The C(.) operator corresponds to the per-pixel multiplication with the complexity map. This operator ensures that the watermark embedded in the low complexity regions is attenuated.

The M(.) operator corresponds to the temporal filtering as described in Appendix A. In some implementations, an illustrative filter length as high as 20 samples may be appropriate. This operator may help achieve temporal smoothness, but, in some implementations, may not be as dominant as motion directed weight selection in doing so.

The F(.) operator corresponds to low-pass filtering in the spatial domain. In some implementations, perfect low-pass fast Fourier transform (FFT) filtering may be used. In such implementations, the F operator enforces a spatially smooth WM.

Power Adjustment

Turning to block 1045, in some implementations, it may be appropriate to regulate the power of the watermark 110 to control the amount of distortion introduced to the host video 105 when the watermark 110 is embedded therein to produce the watermarked video 120. Power management can be performed by iterating the embedding process. With each iteration, the quantization level can be updated until the desired power level is matched within a predefined margin of error.

In block 1050, the watermark signal 110 as processed above is embedded or encoded onto the input video 105.

Time Synchronization

Figure 15:
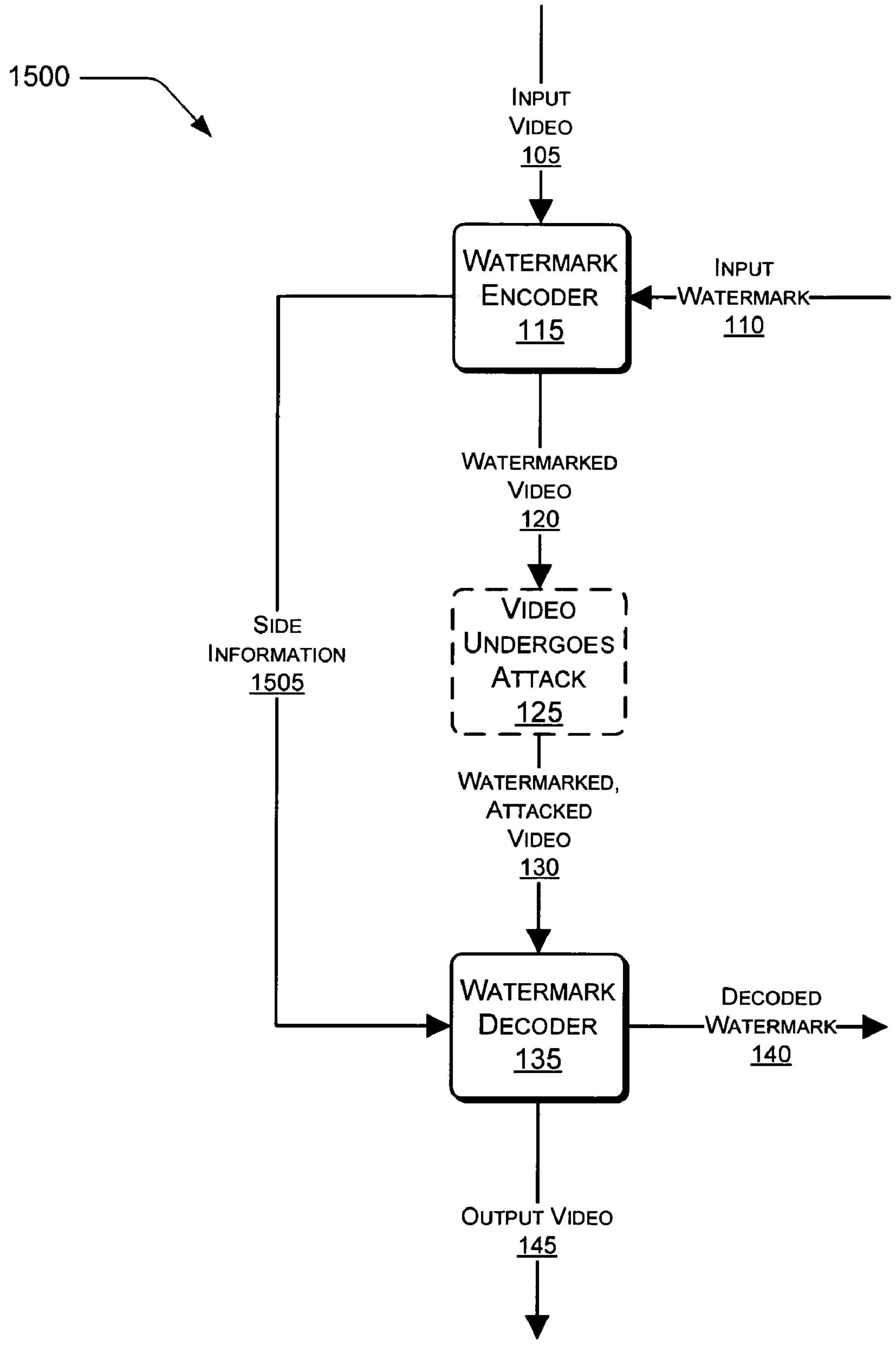
FIG. 15 is a block diagram illustrating an architecture that provides at least one alternative to the architecture shown in FIG. 1.

FIG. 15 illustrates an architecture 1500 that provides at least one alternative to the architecture 100 shown in FIG. 1. The architecture 1500 and techniques related thereto can address additional challenges that may arise in some implementations of video watermarking. These challenges are discussed in more detail below, along with how the architecture 1500 addresses such challenges.

Turning to FIG. 15 in more detail, in some instances, the watermarked video 120 may be temporally distorted. This distortion can be in the form of edits, scene cuts, and/or insertions made to the watermarked video 120. Also, temporal distortion may result from temporal re-sampling performed on the watermarked video 120. The foregoing operations to the watermarked video 120 may or may not be authorized. Such cases of temporal distortion can present the decoder 135 with additional challenges in effectively locating the same watermark embedding regions 215 of the input video 105 that are suitable for embedding the watermark signals 110; this is appropriate in order to have synchronization between encoder and decoder.

One approach to addressing these and other types of temporal distortions is to use a video hash that is based on a two-dimensional (2D) image hash function. One aspect of an algorithm for addressing such temporal distortion includes sending two-dimensional hashes of randomly selected frames within the watermarked video 120 as side information 1505 from the watermark encoder 115 to the watermark decoder 135. It is understood that the side information 1505 is shown separate from the watermarked video 120 in FIG. 15 only for convenience and clarity of illustration and discussion, and not to limit possible implementations of the architecture 1500. Instead, the side information 1505 may be integrated into the watermarked video 120, or can be provided separately from the watermarked video 120.

Turning to the side information 1505 in more detail, it can include the two-dimensional hash values mentioned above. The side information 1505 can also include data representing the motion fields described above, such as the motion vectors 405 and 410 (FIG. 4), and/or the cumulative motion vectors 505 and 515 (FIG. 5). The side information 1505 may also include other data as described in further detail below.

An image hash function suitable for generating the hash values that can be sent as at least part of the side information 1505 is now described.

Image Hash Function

The architectures 100 and 1500 are discussed based on the assumption that a fast and robust image hash function is available. Let $h(\cdot)$ denote such a hash function. In this case, $h(S)$ represents the hash value of an input image S. In the architectures 100 and 1500 taught herein, the hash function $h(\cdot)$ can be applied to respective video frames. Furthermore, it is assumed that the output of the hash function is a binary string of length L. That is, the range of $h(\cdot)$ is $\{0, 1\}^L$. Let $d(\cdot, \cdot)$ denote the normalized Hamming distance, as normalized by L. In this case, then, it is assumed that the hash function $h(\cdot)$ satisfies the following properties:

$h(S)$ is approximately uniformly distributed in $\{0, 1\}^L$ for any given input image S.

$\Pr[d(h(S_i), h(S_j)) \geqq T_1] \approx 1$, where $S_i$ and $S_j$ are perceptually different images (objects).

$\Pr[d(h(S_i), h(S'_i)) \leqq T_0] \approx 1$, where $S_i$ and $S'_i$ are perceptually approximately the same images (objects).

With an efficient hash function, $T_1$ should be greater than $T_0$, with $T_1$ as close as possible to 0.5. The latter value is the expected Hamming distance between two hashes randomly selected from a uniform distribution. Further, $T_0$ should be as close to 0 as possible. Any hash function $h(\cdot)$ that satisfies the aforementioned properties can be used in the algorithms taught herein. In the remainder of the description herein, $S_i$ is used to denote the i-th frame of a given digital input video 105 at the watermark encoder 115. Similarly, $X_i$ is used to denote the i-th frame of a given digital watermarked video 120 at the watermark decoder 135. As used herein, the variable i can be referred to as a "temporal frame index".

Encoder Side Operation

Figure 16A:
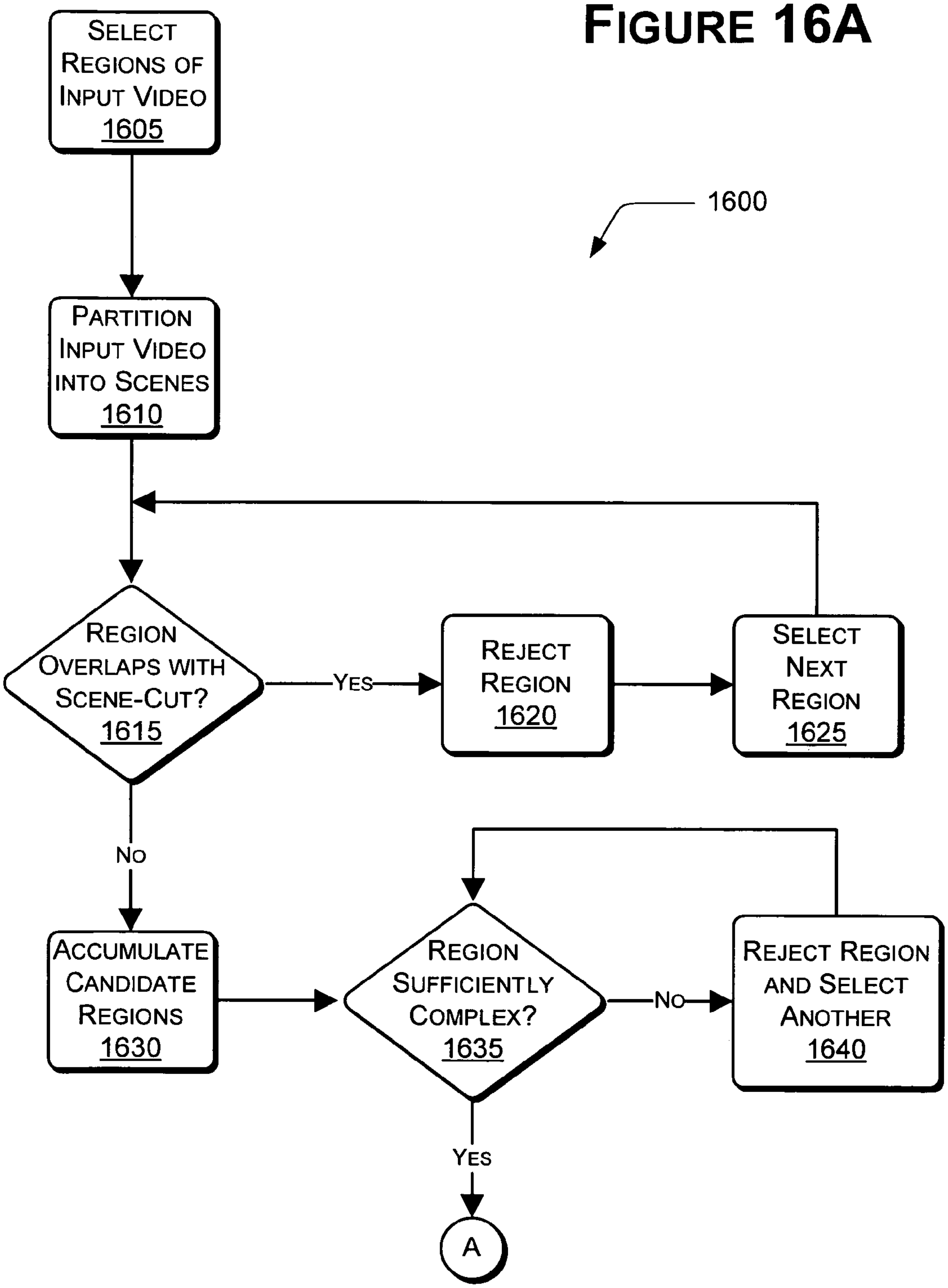
FIGS. 16A and 16B are flow diagrams illustrating a process flow suitable to enable the watermark encoder to generate watermarked video in connection with the architecture shown in FIG. 15.
Figure 16B:
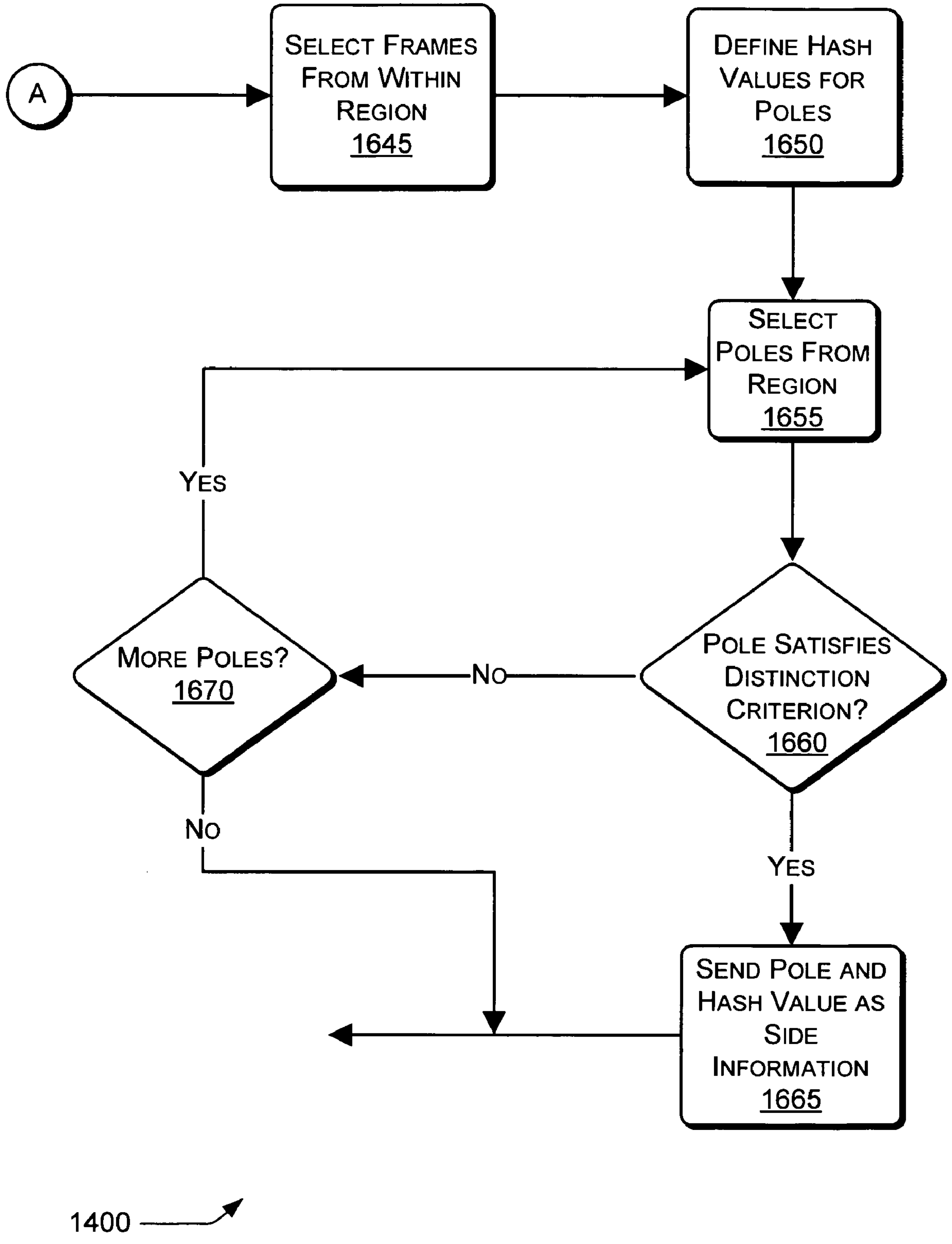

FIGS. 16A and 16B illustrate a process flow 1600 suitable to enable the watermark encoder 115 to generate the watermarked video 120 in the architecture 1500. For clarity and convenience, the process flow 1600 is broken across FIGS. 16A and 16B, and is connected by the reference "A" as shown in these two Figures.

As represented in block 1605, at the watermark encoder 115, one task is to select one or more appropriate regions of the input video 105 in which to embed the input watermark 110. While a completely random (i.e., uniformly distributed) selection may be appropriate in terms of security, it is described herein to choose the regions randomly (uniformly distributed) within a subset of all possible selections, such that the watermark decoder 135 is more likely to produce reliable results when producing the output video 145 from the watermarked video 120.

To perform the task of selecting regions, the input video 105 can first be partitioned into scenes, as represented in block 1610. This approach helps to combat "scene-cut" type attacks, which are one type of attack represented by the block 125. Having partitioned the input video 105 into scenes, one criterion in selecting an appropriate region in which to embed the watermark 110 is that a selected region should not overlap with any scene-cut. In block 1615, this condition is evaluated. If the given region overlaps with a scene-cut, the region is rejected, as shown in block 1620. Afterwards, another candidate region is selected (block 1625), and the process 1600 then returns to block 1615 to evaluate the region.

When a candidate region passes block 1615 (i.e., does not overlap with a scene-cut), the process 1600 can, for convenience, accumulate or otherwise store for future reference the candidate regions that do not overlap scene-cuts, as represented in block 1630.

In block 1635, the process 1600 evaluates whether the candidate regions are sufficiently complex to embed the watermark 110. A given region of the input video 105 is considered to be suitable for embedding the watermark 110 if it is sufficiently complex, i.e., the video region exhibits high entropy. The complexity of given regions of the input video 105 can be determined by using statistical complexity measures, as discussed in detail above.

The rationale for selecting highly complex (i.e., high entropy) regions of the input video 105 is that regions with low entropy are more likely to show perceptually annoying artifacts after the watermarks 110 are embedded therein. As a byproduct of this characteristic, such regions of the input video 105 may be more susceptible to malicious estimation attacks. Malicious estimation attacks are another example of the attacks represented generally in block 125. Malicious estimation attacks aim to estimate the watermark and/or the unmarked host signal via exploiting the differences (if any) in the statistical characterization of the watermark and the unmarked signal. For instance, if the watermark is designed to be in the form of a high-frequency noise and added to directly on top of a signal which is low-frequency dominated, it could be possible to erase most of the watermark by some cleverly-designed noise-removal (also termed as denoising) algorithms. Such broad classes of attacks are called malicious estimation attacks and it is the designer's responsibility to design the watermark such that the watermark statistically resembles the unmarked signal as much as possible. Illustrative techniques for measuring the statistical complexity of regions of the input video 105 are described above.

The regions of the input video 105 into which the watermark 110 is embedded can be selected based on one or more complexity measures, such as the spatial complexity measure 315, the temporal complexity measure 320, and/or the final per-pixel complexity measure 330, as shown in FIG. 3. Using one or more of these complexity measures, the process 1600 can determine whether a candidate region is sufficiently complex to embed the watermark 110. If the region is not sufficiently complex, the process 1600 proceeds to block 1640, where the candidate region is rejected and a new candidate region is selected. The new candidate region is then evaluated by branching back to block 1635.

From block 1635, if the candidate region is sufficiently complex, then within each selected region, at least $N_p$ frames can be selected as "representative frames", as represented in block 1645. These representative frames can be called (for ease of description but not limitation) "poles", and their temporal frame indices are denoted as $\{P_i\}$, $i \in \{1, \ldots, N_P\}$. In block 1650, hash values can be defined for each of the poles.

Without loss of generality, it is assumed that the corresponding poles $\{S_{Pi}\}$ are sorted temporally, i.e., that $P_i > P_{i-1}$, for all i. Furthermore, the poles can be randomly selected within each watermark region from a uniform distribution, subject to the condition that the distances between the hash values of neighboring poles are sufficiently high, as represented in block 1655. This condition can be referred to as the distinction criterion. The hash values of these poles can form, at least in part, the side information 1505 that is sent from the watermark encoder 115 to the watermark decoder 135, to enable the latter to perform temporal re-synchronization on the watermarked video 120. Hence, these hash values constitute the perceptually-representative information for an embedding region.

The aforementioned distinction criterion promotes accurate representation of each watermark region as a whole at the watermark decoder 135. The distinction criterion helps to ensure that the poles stand distinct enough from their neighboring regions. The rationales described herein can be better understood by the following example. Consider a region of the input video 105 characterized by a constant background and very little foreground motion. If a pole is selected from such a region, it may be difficult to re-synchronize to the temporal location of this pole at the watermark decoder 135, even in the absence of attacks. This difficulty may result because a robust image hashing algorithm run on several similar poles from this region would be expected to output several hash values that are close to one another. Accordingly, at the watermark decoder 135, it may be difficult to identify where one of the poles fits in temporally within the region, based only on the hash values corresponding to the several poles.

Therefore, given a candidate watermark region, that region is analyzed to determine if that region would be suitable for re-synchronization at the watermark decoder 135. Put differently, poles from the candidate region can be analyzed to determine if any of them satisfy the distinction criterion (block 1660). If one or more poles meet the distinction criterion, the hash values of one or more of these poles can be sent as side information to the watermark decoder 135 (block 1665). This processing can be performed in addition to the complexity analysis described above.

If the pole does not meet the distinction criterion, the process 1600 can proceed to block 1670 to evaluate whether any more candidate poles are to be evaluated. If so, the process 1600 returns to block 1655 to select another candidate pole, and that candidate pole is evaluated in block 1660.

Having set forth the architecture 1500 and the process flow 1600, the distinction criterion is described and defined in more detail. Let $\{P_i-\Delta_i, P_i-\Delta_i+1, \ldots, P_i+\Delta_i\}$ denote a temporal neighborhood of the i-th pole located at $P_i$, where $\Delta_i \in Z^+$ is an input parameter to the algorithm. For each pole $S_{Pi}$, the average distance between its hash value and the hash values of its neighboring poles is calculated as follows:

$$D_i \triangleq \frac{1}{2\Delta_i + 1} \sum_{j=P_i-\Delta_i}^{P_i+\Delta_i} d(h(S_{P_i}), h(S_j)), \quad i \in \{1, \ldots, N_P\} \tag{5}$$

Choosing a threshold $T_D$ as an input parameter to the algorithm, a video region can be declared unsuitable for re-synchronization if $D_i < T_D$ for some i. In implementations of the teachings herein, $T_D$ can be determined heuristically based on experiments. If a candidate watermark region is declared to be suitable to re-synchronization, the hash values of the poles, $\{h(S_{Pi})\}$, are computed and sent to the watermark decoder 135 as side information 1505. This process can be carried out for each watermark embedding region.

Decoder Side Operation

Figure 17:
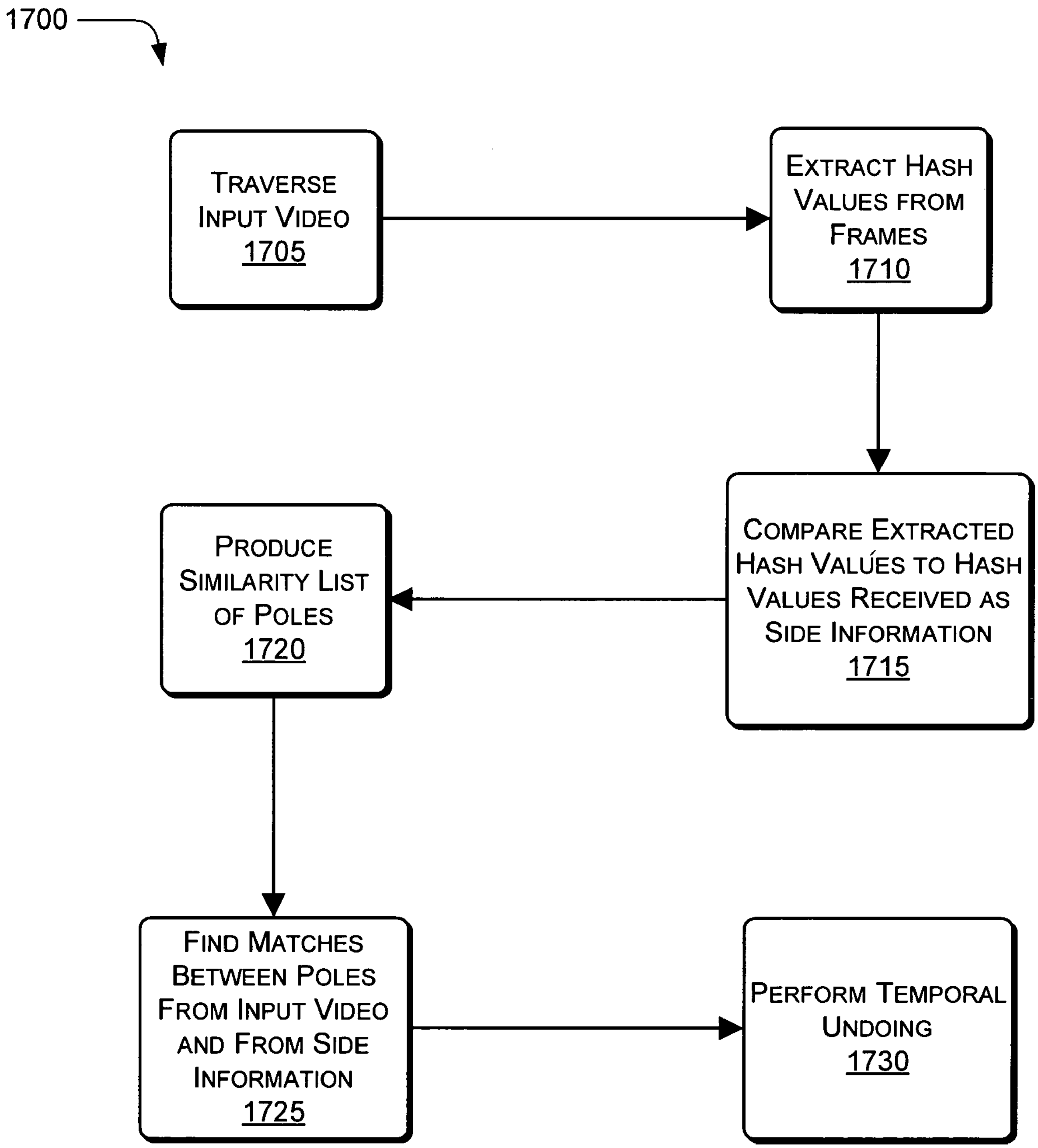
FIG. 17 is a flow diagram illustrating a process flow suitable for processing watermarked video.

FIG. 17 illustrates a process flow 1700 suitable for processing watermarked video. For example, the process flow 1700 may be performed by or in connection with the watermark decoder 135. The watermark decoder 135 can receive as input the watermarked video 120 or the watermarked/attacked video 130. For convenience of discussion but not limitation, the input to the watermark decoder 135 is denoted herein as the watermarked video 120. However, it is understood that the watermarked/attacked video 130 could also be input to the watermark decoder 135.

Turning to FIG. 17 in more detail, in block 1705, the watermarked video 120 that is input to the watermark decoder 135, referred to symbolically as $\{X_i\}$, is traversed. In block 1710, the hash values of all of the frames present in the video 120 are extracted. As a result, the hash values $\{h(X_i), i \in \{1, 2, \ldots, N_x\}$ are obtained, where $N_x$ denotes the total number of frames in the input video 120. In general, there may be an arbitrary number of watermark embedding regions in the video 120. However, for brevity and convenience, the discussion herein is confined to a single watermark region, with the understanding that the discussion could be readily applied to any number of watermark regions. Similar operations would be performed separately for each watermark region.

In block 1715, in order to temporally match a watermark region, one task is to perform, for example, a fuzzy comparison between the original hash values of the poles of that region, represented as $\{h(S_{Pj})\}$, and the hash values of the frames of the received video 120, represented as $\{h(X_i)\}$. Recall that the hash values of the poles of the region can be provided as at least part of the side information 1705. In this manner, a similarity list for each pole can be populated, as represented in block 1720. Let $L_j$ denote the similarity list (i.e., a set of temporal frame indices) of the original pole $S_{Pj}$, $j \in \{1, 2, \ldots, N_P\}$. Using the above, the similarity list $L_j$ can be defined as:

$$L_j \triangleq \{i \in \{1, 2, \ldots N_X\} \mid d(h(X_i), h(S_{P_j})) < \epsilon_H\}, \quad j \in \{1, 2, \ldots, N_P\}.$$

Here, $\in_H$ is an input parameter to the algorithm, and is chosen with care since the average size of each similarity list, and in return the synchronization performance of the described algorithm, depends on its value. If $\in_H$ is chosen to be too small, the described algorithm may miss the real pole in the populated similarity list, for example, due to malicious attacks. This would result in the failure of the synchronization algorithm. On the other hand, if $\in_H$ is chosen to be too high, each similarity list can unnecessarily include many inaccurate pole candidates. This condition may result in an unmanageable algorithm in implementation, because of the required computational workload imposed by the high number of pole candidates. From this perspective, choosing a "good" image hash function directly enhances the performance of the algorithm, since as the accuracy of the underlying hash function increases, it becomes feasible to choose smaller values of $\in_H$ without the algorithm failing to synchronize.

Having produced the similarity lists $\{L_j\}$ for the original poles $\{S_{Pj}\}$, the next step is to select the best N-tuple (one from each similarity list $L_j$), such that:

1. The original pole distribution and the candidate pole distribution are matched temporally as much as possible (criterion 1), and 2. The sum of the distances between the hash values of the original poles and pole candidates are minimized (criterion 2).

Criterion 1 limits how much change is permitted between the temporal locations of two poles. It will be shortly seen that this leads to significant performance gains in the sense of algorithmic complexity, even in the presence of an allowed error margin for robustness against malicious temporal attacks. One example of such an attack would be to time-compress certain regions of video and/or apply video interpolation to them, thereby changing the temporal distribution of the original poles.

Let $Q \in \mathbb{Z}^{+NP}$ denote a candidate pole location vector that consists of temporal frame indices in the received video $\{X_i\}$, where $Q=\{Q_1, Q_2, \ldots, Q_{NP}\}$. Note that in an illustrative case of no attacks or modifications (i.e., $X_i=S_i$, for all i), it may be desired to find $Q_i=P_i$, $1 \leqq i \leqq N_P$ using the instant algorithm, since the original poles would be unchanged in this case. Combining criteria 1 and 2, the following combinatorial optimization problem is to be solved:

$$\min_Q \sum_{j=1}^{N_P} d(h(X_{Q_j}), h(S_{P_j})) \tag{6}$$

such that $$\forall j \in \{1, 2, \ldots, N_P\},\ Q_j \in L_j, \tag{7}$$

and $$\forall j \in \{1, 2, \ldots, N_P - 1\},\ \left|1 - \left|\frac{Q_j - Q_{j+1}}{P_j - P_{j+1}}\right|\right| < \epsilon_T, \tag{8}$$

where $\in_T$ is the maximum allowed temporal scaling (i.e., corresponds to the allowed error margin for robustness against temporal attacks). Note that, here (6) (respectively (8)) represents the aforementioned criterion 2 (respectively criterion 1).

If we have $|L_j| \approx M$ on average, then the size of a feasible set is about $M^{Np}$. This implies that an assumed straightforward implementation that uses an exhaustive search would require $O(M^{Np})$ tests. In such an implementation, this may lead to an algorithmic complexity that may be unacceptably high and may even be infeasible, considering that similarity lists can potentially be hundreds of frames long and there may be about 15-30 poles per region.

To overcome the computational burden of this combinatorial optimization problem, a trellis-based search method is described. This search method exploits dynamic programming, and the algorithmic steps of the search method are given in Table 1.

TABLE 1

| | |
|---|---|
| 1. | $d_{i,j} = \infty$, $i \in \{1, \ldots, M_j\}$ and $j \in \{1, \ldots, N_p\}$ |
| 2. | $C(j) = 1$, $j \in \{1, \ldots, N_p\}$, $bestpath_{dist} = \infty$ |
| 3. | do |
| 3.1 | Initialize p = 1 and $sum_{dist} = 0$, terminate=false |
| 3.1.1 | $sum_{dist} = sum_{dist} + d(h(X_{L_p(C(p))}), h(S_{P_p}))$ |
| 3.1.2 | if $sum_{dist} \leqq d_{C(p),p}$ |
| 3.1.2.1 | $d_{C(p),p} = sum_{dist}$ |
| 3.1.3 | else if $sum_{dist} > d_{C(p),p}$ |
| 3.1.3.1 | Set $C(k + 1) = M_k$, for $k \in \{p, \ldots, N_p\}$ |
| 3.1.3.2 | terminate = true, goto 3.2 |
| 3.1.4 | if $\left|1 - \frac{L_p(C(p)) - L_{p-1}(C(p-1))}{P_p - P_{p-1}}\right| > \epsilon_T$ |
| 3.1.4.1 | Set $C(k + 1) = M_k$, for $k \in \{p, \ldots, N_p\}$ |
| 3.1.4.2 | terminate = true, goto 3.2 |
| 3.1.2 | p = p+1, if $p \leqq N_p$ goto 3.1.1 |
| 3.2 | if terminate == false and $bestpath_{dist} > sum_{dist}$ |
| 3.2.1 | result(i) = C(i), $i \in \{1, \ldots, N_p\}$ |
| 3.2.2 | $bestpath_{dist} = sum_{dist}$ |
| 3.3 | If C is at the limit |
| 3.3.1 | goto 4 |
| 3.4 | else |
| 3.4.1 | Increment C, goto 3.1 |
| 4. | result holds the optimal path. |

Brief Description of the Proposed Algorithm in Table 1: dynamic programming techniques are applied by using a special $N_P$ digit counter $C \in Z^{+NP}$, $C(j) \in \{1, \ldots, M_j\}$, where C(j) denotes the j-th component of C. Each digit of C has a different base: $1 \leqq C(j) \leqq M_j$, where $M_j=|L_j|$. For example, for a 3-digit counter with bases {2, 3, 2}, the counter can run as follows: {1, 1, 1}, {1, 1, 2}, {1, 2, 1}, {1, 2, 2}, {1, 3, 1}, {1, 3, 2}, {2, 1, 1}, . . . . {2, 3, 2}.

The counter is increased until it reaches the upper bound. The j-th digit of the counter C represents the temporal frame index of the j-th candidate pole $Q_j$, i.e., $Q_j=L_j(C(j))$, $1 \leqq j \leqq N_P$, where $L_j(n)$ denotes the n-th largest element of $L_j$. At each increment of the counter C, the validity of the specified path is tested. For each entry in the similarity lists, a variable $d_{i,j}$, with $i \in \{1, \ldots, M_j\}$ and $j \in \{1, \ldots, N_P\}$, is defined. This variable $d_{i,j}$ is initialized to a "high" value. The variables $d_{i,j}$ are active variables, and represent the minimum of the sum of distances observed since the beginning of the counter.

Remark 2: The efficiency of the described algorithm is due, at least in part, to the early termination tests at the steps of 3.1.3 and 3.1.4 in Table 1. Note that 3.1.3 is a valid test, because if $sum_{dist}$ at that point is larger than a previous path's sum, than there is no point in continuing with this path, since the algorithm has already found a better path to that point. Also, 3.1.4 is a test that is included to emphasize the allowable temporal scaling limits. Steps 3.1.3.1 and 3.1.4.1 are the purging steps, where the rest of the invalid path is effectively removed from the search space, thus increasing the search speed.

Fine-Tuning Using Image Registration

At the end of block 1725, using the algorithm given in Table 1, we find the poles from the received video such that these poles match as much as possible with the original poles of the original unmarked video. However, in most practical situations, the match between the resulting poles of the received video and the original poles of the original unmarked video does not need to be exact. This is possible due to the potential existence of malicious geometric attacks (such as time interpolation, rotation, cropping, etc) that the received video may have gone through. In order to "perceptually match" the received video to the original video further, we "warp" the resulting poles of the received video to the original poles of the original unmarked video as accurately as possible. To achieve this task, we can use image registration techniques. In other words, we "register" the received poles to the original poles and thus, we hope to achieve optimal geometric synchronization between the received video and the original unmarked video. For the pole i at $Q_i$, try to register the original pole $S_i$ to $X_j$, $|j-Q_i|<\tau_s$. A value of j is chosen that maximizes the "success of registration" metric, and the fine-tuned receiver side poles are denoted with $Q_i'$. Such a metric can be minimization of L2 norm. $\tau_s$ can be the temporal search neighborhood, and can be, for example, as long as 20 frames.

Temporal Undoing

In block 1730, once the fine tuned poles ($Q_i'$) are found, temporal undoing can be applied on the synchronized region to achieve at least two goals:

1. Match the received region's length to the original region's length, and

2. If the lengths match, perform piecewise linear temporal scaling to undo any mismatch within the region.

Assume that a temporal video interpolation algorithm is available. For a suitable example of the foregoing interpolation algorithm, see S. B. Kang, M. Uyttendaele, S. A. J. Winder, and R. Szeliski, "High dynamic range video," Proceedings of ACM Siggraph, 2003. Given M frames, this algorithm would generate N frames, and could be applied to each pole-pair as follows. The region between poles i and i+1, which is $Q'_{i+1}-Q_i'$ frames long, is mapped to $S_{i+1}-S_i$ frames. Then the remapped regions are concatenated to generate the final temporal undone region.

Key Management

Figure 18:
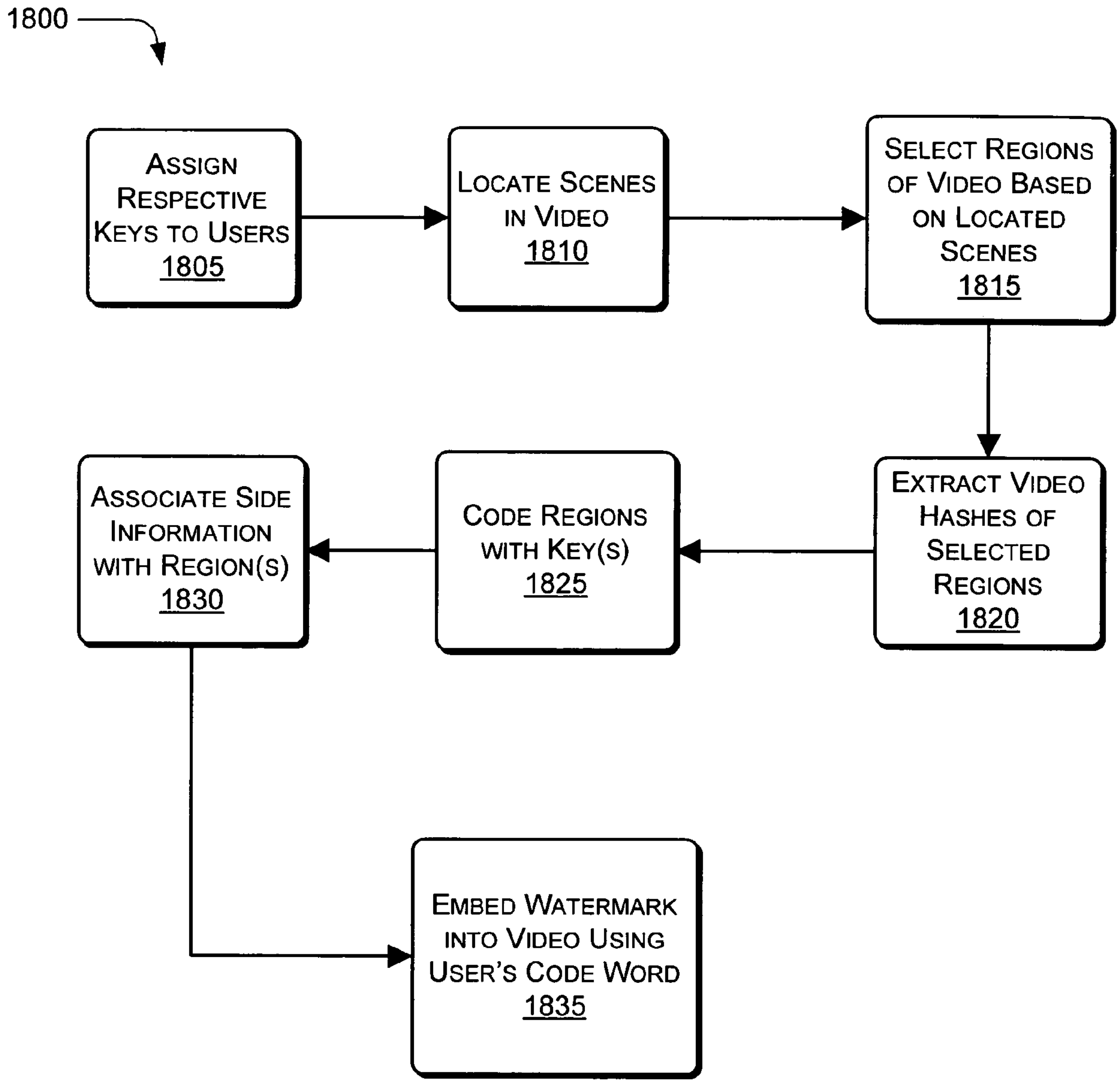
FIG. 18 is a flow diagram illustrating a process flow for encoding a watermark using a symbol-based key management system.

FIG. 18 illustrates a process flow 1800 for encoding a watermark using a symbol-based key management system. The process flow 1800 can be performed by, for example, the watermark encoder 115.

Key Assignment

In block 1805, users can be assigned or associated with respective identifiers (IDs) in the form of codewords. For example, if each symbol is allocated some number of binary bits, than an illustrative ID for a given user can be 1001101001101; here the length of the ID is the same as the number of embedding regions in video. Alternatively, it is possible to apply an error correction code to the user IDs and increase the length such that the length of the encoded ID is the same as the number of mark-embedding regions in video; if this is employed, then the decoder can apply an error correction decoding strategy accordingly after decoding the bits for each embedding region in the video. Once a "bit" (either zero or one) is assigned to each embedding region, each region can then be embedded with a pseudo-random key, which may be generated from a master "zero" key and a master "one" key. Note that, in this construction, the "zero" keys and the "one" keys for different regions may potentially be different and pseudo-randomly generated from the master "zero" key and master "one" key. Afterwards, the regions can be edited and combined to generate a properly coded video.

Preprocessing

A given video 105 to be fingerprinted can be preprocessed. In block 1810, the scenes in the video 105 are located. Any method for detecting scenes and/or scene cuts may be suitable. For example, a thresholding based on two-dimensional image hashes can be used. If the hash distance between frame $f_i$ and $f_{i-1}$, ($D(f_i; f_{i-1})$) is greater than $$\frac{1}{N}\sum_{j=1}^{N} D(f_{i-1}, f_{i-j}),$$

then the frame $f_i$ can be labeled as a scene change. Further improvements, such as histogram comparisons, are also possible and may be especially appropriate to capture blending-type scene changes. In general, any scene detection algorithm can be used at this stage.

Region Selection

In block 1815, the scene information is used to select random regions in the video 105. In some implementations, these regions do not overlap with the scene boundaries, and these regions do not overlap with each other. These random regions should possess certain complexity properties such that they are suitable for watermarking. In general other potential robustness properties under several attacks may be employed for the region selection mechanism.

Once the scenes and/or scene cuts are detected, $N_R$ regions can be selected. Each region can be selected randomly, but nevertheless selected based on certain criteria. Once a random region that does not fall onto any other previously selected regions is selected, the spatial and temporal complexity measures 315 and 320 for this region are computed as described above. The resulting per-pixel complexity measure 330 for this region is then thresholded. If the total number of pixels that pass the threshold is greater than, for example, half of the total pixels in the region, the region can be selected. Otherwise, the region can be discarded and another random region is selected for complexity measurement and thresholding analysis.

This process can be repeated until $N_R$ regions are selected. After the selection process in block 1815, the video hashes of each of the $N_R$ regions can be extracted and stored as side information, as represented in block 1620.

Pre-Embedding

In block 1825, each given region can be coded with the keys $K_{i0}$ and $K_{i1}$, $i \in 1, \ldots, N_R$. $K_{i0}$ and $K_{i1}$ are the i-th pseudo-random keys generated from the "zero" and "one" master keys $K_{M0}$ and $K_{M1}$ respectively. This coding process results in video segments $\hat{R}_{i0}$ and $\hat{R}_{i1}$ for the $N_R$ regions.

Side Information

In block 1830, the side information 1505 can be associated with the regions. Side information 1505 for a given region can include the forward and backward motion vectors 410 and 415, the forward and backward cumulative motion vectors 510 and 515, the video hashes of the regions, and side information for the keys $K_0$ and $K_1$.

Embedding

In block 1835, the watermark 110 is embedded into the selected region of the video 105. Embedding refers to editing the video 105 based on the codeword for a particular user. For a user u with a codeword $CW_u=(b_0, \ldots, b_{N_R})$, such that all $b_i \in \{0, 1\}$, the editing is the concatenation of regions $$\hat{R}_{ib_0} \ldots \hat{R}_{ib_{N_R}}$$

of the video 105.

Watermark Detection

Region Identification

After the synchronization process is performed using, for example, the process flow 1700 shown in FIG. 17, the locations of the embedding regions in the video 120 can be determined. Since the watermark decoder 135 knows which keys are associated with which users, it can use the same pseudo-random generation processes as the watermark encoder 115, and can generate the same weights as the watermark encoder 115 did previously.

One way of detecting whether a given region i is embedded with a given key k is to determine the correlation C, as follows $$C = \frac{< \tilde{\mu}_{ik} - \mu_{ik}, \hat{\mu}_{ik} - \mu_{ik} >}{\|\hat{\mu}_{ik} - \mu_{ik}\|} \tag{9}$$

$\mu_{ik}$ can be sent as side information, and $\hat{\mu}_{ik}$ is the quantized coefficient. $\tilde{\mu}_{ik}$ is the coefficient calculated at the receiver. If C is greater than a threshold $\tau$, then the user i can be labeled as involved in producing the given region.

Note that is the foregoing describes one illustrative method of using the watermarking system. In connection with FIG. 19 below, a different detection rule is described that may be appropriate for handling multiple regions and users.

Dynamic Range Undoing

The side information 1505 for each region can contain the histogram of the original frames of that region. At the decoder side, once the region is "temporally undone", the histograms of the received frames can be re-mapped to the histograms of the original frames. As a result, this effectively undoes any histogram mapping type of attacks.

Registration Based Undoing

Suppose two regions $R_i$ and $\tilde{R}_i$ are given. Using an image registration algorithm, the per-pixel mapping C can be found that takes $\tilde{R}_i$ to $R_i$. If C is applied to $\tilde{R}_i$, the image $\tilde{R}_i'$ results. Undoing can be performed on a given region $\tilde{R}_i$ and the calculation of $\tilde{\mu}_{ik}$ can be carried out over the "undone" region $\tilde{R}_i'$.

Detection by Watermark Decoder

Figure 19:
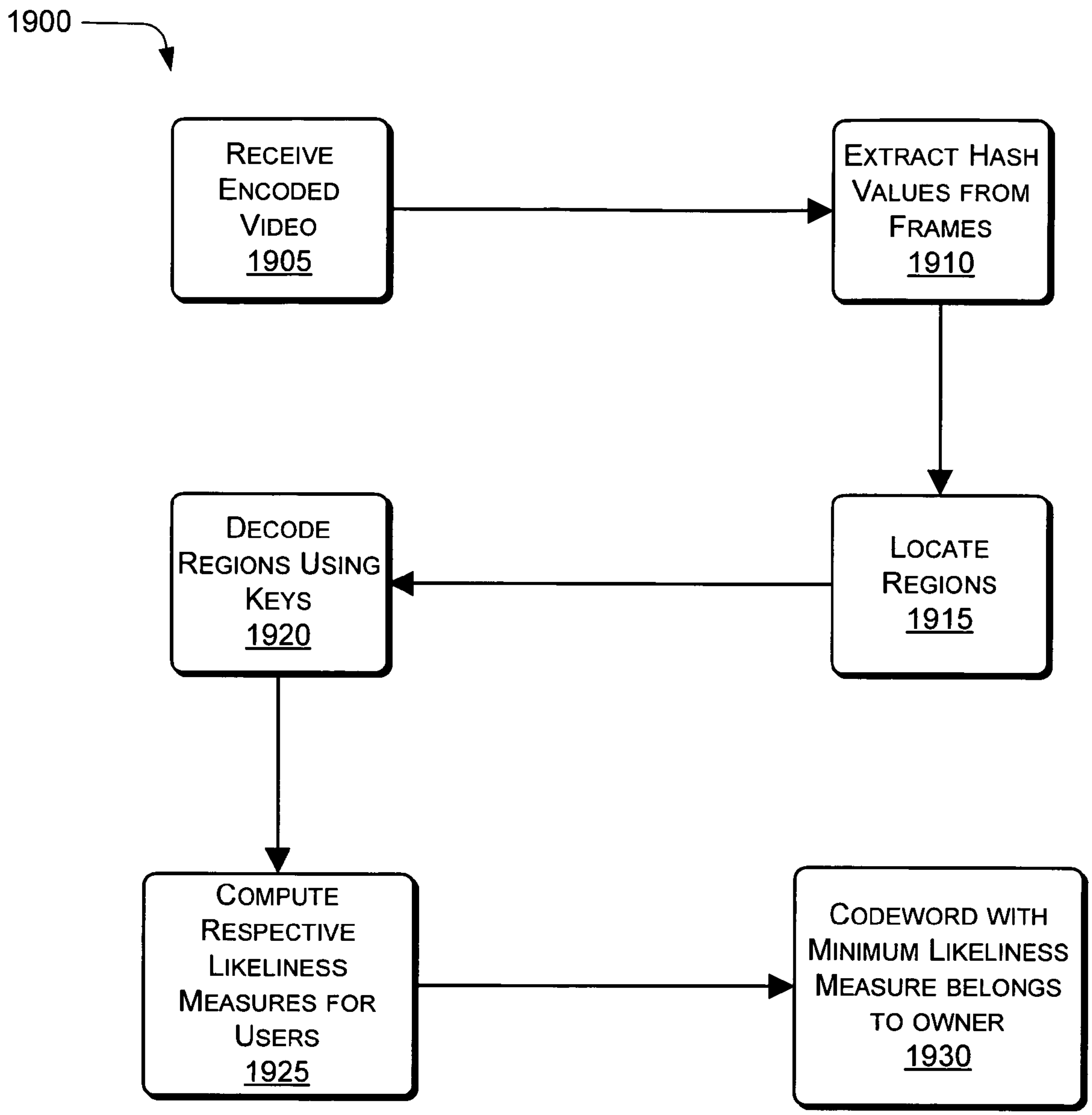
FIG. 19 is a flow diagram illustrating a process flow for detecting a watermark using a symbol-based key management system.

FIG. 19 illustrates a further process flow 1900 for detecting a watermark using a symbol-based key management system. The process flow 1900 can be performed by, for example, the watermark decoder 135.

In block 1905, the video 120 is received by, for example, the watermark decoder 135. In block 1910, detection can start by extracting the hashes generated to synchronize the regions during the encoding process 1800. In block 1915, the regions in the input video 120 corresponding to the extracted hashes are located. Once the regions are found, each region can be decoded using the keys $K_{i0}$ and $K_{i1}$, as represented in block 1920. This results in $\tilde{\mu}_{i0}$ and $\tilde{\mu}_{i1}$ being obtained or extracted; note that, here $\tilde{\mu}_{i0}$ and $\tilde{\mu}_{i1}$ represent the statistics of the received video obtained by using the keys $K_{i0}$ and $K_{i1}$, respectively. In block 1925, for each user with codeword $CW_u$, a respective likeliness measure $L_u$ can be calculated as:

$$L_u = \sum_{i=1}^{i=N_R} \|\hat{\mu}_{ib} - \tilde{\mu}_{ib}\|, \; b \in \{0, 1\}. \tag{10}$$

In block 1930, the codeword that results in the minimum $L_u$ is identified as the owner. The owner as determined in block 1930 is the user whose "fingerprint" was used in connection with watermarking the input video 105 by the watermark encoder 115. As such, if the watermarked video 120 undergoes some type of attack (block 125), the process 1900 can establish that the owner is at least in the chain of custody involving the attacked video 130. In some instances, this may suggest that the owner actually performed the attack on the video 130. In other instances, this may indicate that the owner leaked the video 105 to one or more authorized parties, whether voluntarily or involuntarily.

Figure 20:
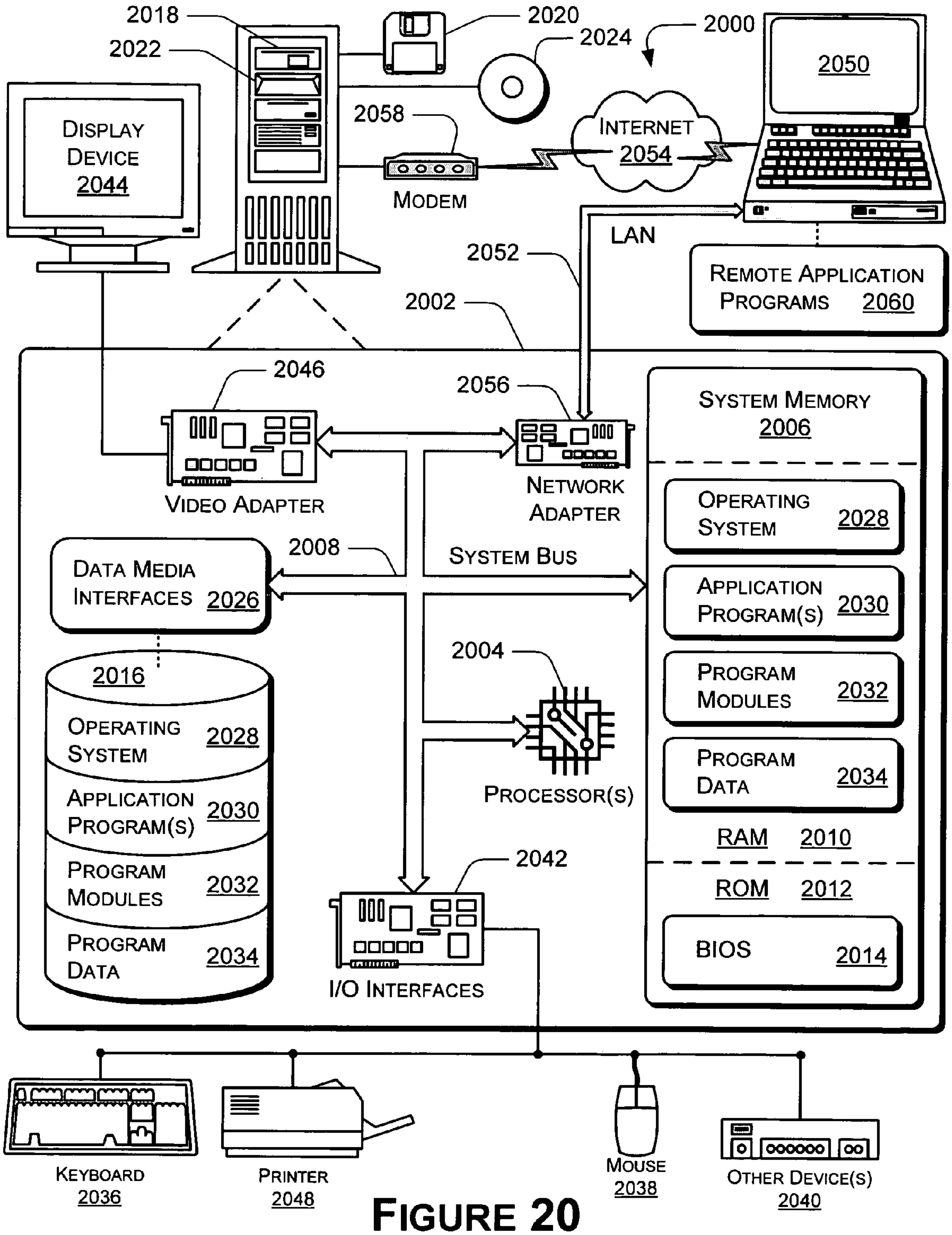
FIG. 20 illustrates an exemplary computing environment within which systems and methods for video fingerprinting using watermarks, as well as the computing, network, and system architectures described herein, can be either fully or partially implemented.

FIG. 20 illustrates an exemplary computing environment 2000 within which systems and methods for video fingerprinting using watermarks, as well as the computing, network, and system architectures described herein, can be either fully or partially implemented. For example, aspects of the computing environment 2000 may be suitable for implementing the watermark encoder 115 and/or the watermark decoder 135, as well as the components thereof as described above.

Exemplary computing environment 2000 is only one example of a computing system and is not intended to suggest any limitation as to the scope of use or functionality of the architectures. Neither should the computing environment 2000 be interpreted as having any dependency or requirement relating to any one or combination of components illustrated in the exemplary computing environment 2000.

The computer and network architectures in computing environment 2000 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 2000 includes a general-purpose computing system in the form of a computing device 2002. The components of computing device 2002 can include, but are not limited to, one or more processors 2004 (e.g., any of microprocessors, controllers, and the like), a system memory 2006, and a system bus 2008 that couples the various system components. The one or more processors 2004 process various computer executable instructions to control the operation of computing device 2002 and to communicate with other electronic and computing devices. The system bus 2008 represents any number of several types of bus structures, including a memory bus or memory controller, a peripheral bus, an accelerated graphics port, and a processor or local bus using any of a variety of bus architectures.

Computing environment 2000 includes a variety of computer readable media which can be any media that is accessible by computing device 2002 and includes both volatile and non-volatile media, removable and non-removable media. The system memory 2006 includes computer readable media in the form of volatile memory, such as random access memory (RAM) 2010, and/or non-volatile memory, such as read only memory (ROM) 2012. A basic input/output system (BIOS) 2014 maintains the basic routines that facilitate information transfer between components within computing device 2002, such as during start-up, and is stored in ROM 2012. RAM 2010 typically contains data and/or program modules that are immediately accessible to and/or presently operated on by one or more of the processors 2004.

Computing device 2002 may include other removable/non-removable, volatile/non-volatile computer storage media. By way of example, a hard disk drive 2016 reads from and writes to a non-removable, non-volatile magnetic media (not shown), a magnetic disk drive 2018 reads from and writes to a removable, non-volatile magnetic disk 2020 (e.g., a "floppy disk"), and an optical disk drive 2022 reads from and/or writes to a removable, non-volatile optical disk 2024 such as a CD-ROM, digital versatile disk (DVD), or any other type of optical media. In this example, the hard disk drive 2016, magnetic disk drive 2018, and optical disk drive 2022 are each connected to the system bus 2008 by one or more data media interfaces 2026. The disk drives and associated computer readable media provide non-volatile storage of computer readable instructions, data structures, program modules, and other data for computing device 2002.

Any number of program modules can be stored on RAM 2010, ROM 2012, hard disk 2016, magnetic disk 2020, and/or optical disk 2024, including by way of example, an operating system 2028, one or more application programs 2030, other program modules 2032, and program data 2034. Each of such operating system 2028, application program(s) 2030, other program modules 2032, program data 2034, or any combination thereof, may include one or more embodiments of the systems and methods described herein.

Computing device 2002 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 2002 via any number of different input devices such as a keyboard 2036 and pointing device 2038 (e.g., a "mouse"). Other input devices 2040 (not shown specifically) may include a microphone, joystick, game pad, controller, satellite dish, serial port, scanner, and/or the like. These and other input devices are connected to the processors 2004 via input/output interfaces 2042 that are coupled to the system bus 2008, but may be connected by other interface and bus structures, such as a parallel port, game port, and/or a universal serial bus (USB).

A display device 2044 (or other type of monitor) can be connected to the system bus 2008 via an interface, such as a video adapter 2046. In addition to the display device 2044, other output peripheral devices can include components such as speakers (not shown) and a printer 2048 which can be connected to computing device 2002 via the input/output interfaces 2042.

Computing device 2002 can operate in a networked environment using logical connections to one or more remote computers, such as remote computing device 2050. By way of example, remote computing device 2050 can be a personal computer, portable computer, a server, a router, a network computer, a peer device or other common network node, and the like. The remote computing device 2050 is illustrated as a portable computer that can include any number and combination of the different components, elements, and features described herein relative to computing device 2002.

Logical connections between computing device 2002 and the remote computing device 2050 are depicted as a local area network (LAN) 2052 and a general wide area network (WAN) 2054. Such networking environments are commonplace in offices, enterprise-wide computer networks, intranets, and the Internet. When implemented in a LAN networking environment, the computing device 2002 is connected to a local network 2052 via a network interface or adapter 2056. When implemented in a WAN networking environment, the computing device 2002 typically includes a modem 2058 or other means for establishing communications over the wide area network 2054. The modem 2058 can be internal or external to computing device 2002, and can be connected to the system bus 2008 via the input/output interfaces 2042 or other appropriate mechanisms. The illustrated network connections are merely exemplary and other means of establishing communication link(s) between the computing devices 2002 and 2050 can be utilized.

In a networked environment, such as that illustrated with computing environment 2000, program modules depicted relative to the computing device 2002, or portions thereof, may be stored in a remote memory storage device. By way of example, remote application programs 2060 are maintained with a memory device of remote computing device 2050. For purposes of illustration, application programs and other executable program components, such as operating system 2028, are illustrated herein as discrete blocks, although it is recognized that such programs and components reside at various times in different storage components of the computing device 2002, and are executed by the one or more processors 2004 of the computing device 2002.

Although embodiments of video fingerprinting using watermarks have been described in language specific to structural features and/or methods, it is to be understood that the subject of the appended claims is not necessarily limited to the specific features or methods described. Rather, the specific features and methods are disclosed as exemplary implementations of video fingerprinting using watermarks.

It is further understood that the foregoing description discloses several process flows and/or related flow diagrams. It is understood that while these process flows may be described herein as being executed in connection with certain components, these process flows could readily be performed or executed in connection with other components without departing from the spirit and scope of the subject matter described herein. It is also noted that various sub-processes are disclosed herein as illustrative sub-components of broader processes. However, implementations of the broader processes need not include all of the illustrative components shown herein, and may include one or more of these illustrative components without departing from the spirit and scope of the subject matter described herein.

What is claimed is:

1. A system comprising:

a memory;

a processor coupled to the memory;

a watermark encoder executed by the processor and adapted to receive as input at least one video and at least one watermark, and to embed the watermark into the video, wherein the watermark encoder is adapted to perform a complexity analysis on a per-pixel basis on at least one region of the video, the complexity analysis based on a statistical video model that provides entropy rates in a direct current sub-band portion of the video;

the watermark encoder adapted to partition the video into one or more scenes having one or more corresponding scene-cuts;

the watermark encoder adapted to select one or more regions of the video to embed the watermark, wherein a region is randomly selected in time without the region overlapping any scene-cuts in the video;

the watermark encoder adapted to embed the watermark into the video by using a two-dimensional discrete wavelet transform along spatial axes;

the watermark encoder adapted to populate side information related to a region of the video, wherein the side information comprises a two-dimensional hash of a randomly selected frame within the video and data representing a motion field of a pixel in the video; and a watermark decoder executed by the processor and adapted to receive a watermarked video and to extract the watermark therefrom, wherein the watermark decoder locates the one or more regions of the video selected by the watermark encoder.

2. The system of claim 1, wherein the watermark encoder is adapted to perform a pixel-wise complexity analysis on at least one region of the video.

3. The system of claim 1, wherein the watermark encoder is adapted to compare at least one region of the video to at least one complexity threshold to determine whether the region is sufficiently complex to embed the watermark therein.

4. The system of claim 1, wherein the watermark encoder is adapted to perform a spatial complexity analysis on at least one region of the video.

5. The system of claim 1, wherein the watermark encoder is adapted to perform a temporal complexity analysis on at least one region of the video.

6. The system of claim 1, wherein the watermark encoder is adapted to combine at least one temporal complexity measure and at least one spatial complexity measure for at least one region of the video into a final per-pixel complexity measure for the region.

7. The system of claim 1, wherein the watermark encoder is adapted to define at least one motion vector associated with a pixel in a frame of the video, wherein the motion vector represents an estimate of the movement of the pixel as the video is played either forward or backward at least one further frame.

8. The system of claim 1, wherein the watermark encoder is adapted to define at least one cumulative motion vector associated with a pixel in a frame of the video, wherein the motion vector represents an estimate of the movement of the pixel as the video is played either forward or backward a plurality of further frames.

9. The system of claim 1, wherein the watermark encoder is adapted to partition the video into respective scenes, and to define at least one candidate region for embedding the watermark based on the respective scenes of the video.

10. The system of claim 1, wherein the watermark encoder is adapted to pass the side information to the watermark decoder.

11. The system of claim 1, wherein the watermark encoder is adapted to define a hash value for at least one frame of the video, and to pass this hash value to the watermark decoder as side information.

12. The system of claim 11, wherein the frame for which the hash values is defined is chosen based at least in part on how distinct the frame is relative to at least one neighboring frame.

13. The system of claim 1, wherein the video decoder is adapted to traverse the watermarked video, to extract hash values for a plurality of frames of the watermarked video, and to match the hash values with further hash values received as side information from the watermark encoder.

14. The system of claim 1, wherein the watermark decoder is adapted to extract a codeword from the watermark, to compare the codeword to a plurality of known codewords associated with respective users, and to estimate which user is associated with the extracted codeword based on the comparison.

15. A computer implemented method having instructions executable by a processor, comprising:

receiving, by a watermark encoder executed by the processor coupled to a memory, at least one video and at least one watermark as input to embed the watermark into the video, wherein the watermark encoder is adapted to perform a complexity analysis on a per-pixel basis on at least one region of the video;

partitioning the video into one or more scenes having one or more corresponding scene-cuts;

selecting one or more regions of the video to embed the watermark, wherein a region is randomly selected in time without the region overlapping any scene-cuts in the video;

embedding the watermark into the video by using a two-dimensional wavelet transform along spatial axes;

populating side information related to a region of the video, wherein the side information comprises a two-dimensional hash of a randomly selected frame within the video and data representing a motion field of a pixel in the video; and receiving, by a watermark decoder executed by the processor coupled to the memory, a watermarked video to extract the watermark from the video, wherein the watermark decoder locates the one or more regions of the video selected by the watermark encoder.

16. The computer implemented method of claim 15, wherein the watermark encoder is adapted to combine at least one temporal complexity measure and at least one spatial complexity measure for at least one region of the video into a final per-pixel complexity measure for the region.

17. The computer implemented method of claim 15, wherein the watermark encoder is adapted to define at least one cumulative motion vector associated with a pixel in a frame of the video, wherein the motion vector represents an estimate of the movement of the pixel as the video is played either forward or backward a plurality of further frames.

18. The computer implemented method of claim 15, wherein the watermark encoder is adapted to define a hash value for at least one frame of the video, and to pass this hash value to the watermark decoder as side information.

19. One or more computer readable storage media storing computer executable instructions that, when executed by a processor of a computer, cause the processor to perform acts comprising:

receiving, by a watermark encoder executed by the processor, at least one video and at least one watermark as input to embed the watermark into the video, wherein the watermark encoder is adapted to perform a complexity analysis on a per-pixel basis on at least one region of the video, the complexity analysis based on a statistical video model that provides entropy rates in a direct current sub-band portion of the video;

partitioning the video into one or more scenes having one or more corresponding scene-cuts;

selecting one or more regions of the video to embed the watermark, wherein a region is randomly selected in time without the region overlapping any scene-cuts in the video;

embedding the watermark into the video by using a two-dimensional wavelet transform along spatial axes; and receiving, by a watermark decoder executed by the processor, a watermarked video to extract the watermark from the video, wherein the watermark decoder locates the one or more regions of the video selected by the watermark encoder.

20. The one or more computer readable storage media as recited in claim 19, wherein the watermark encoder is adapted to combine at least one temporal complexity measure and at least one spatial complexity measure for at least one region of the video into a final per-pixel complexity measure for the region.

* * * * *